(12) United States Patent
Korte et al.

(10) Patent No.: US 11,770,569 B2
(45) Date of Patent: Sep. 26, 2023

(54) PROVIDING RISK BASED SUBSCRIBER ENHANCEMENTS

(71) Applicant: Q'ligent Corporation, Melbourne, FL (US)

(72) Inventors: Ted Korte, Satellite Beach, FL (US); Victor Zaguskin, Nizhny Novgorod (RU); Sergey Lobanov, Nizhny Novgorod (RU); Anatoly Shishin, Nizhny Novgorod (RU); Andrey Kochetkov, Cary, NC (US)

(73) Assignee: Q'ligent Corporation, Melbourne, FL (US)

( * ) Notice: Subject to any disclaimer, the term of this patent is extended or adjusted under 35 U.S.C. 154(b) by 0 days.

(21) Appl. No.: 16/839,610

(22) Filed: Apr. 3, 2020

(65) Prior Publication Data
US 2020/0322662 A1    Oct. 8, 2020

Related U.S. Application Data

(60) Provisional application No. 62/830,072, filed on Apr. 5, 2019.

(51) Int. Cl.
*H04N 21/24* (2011.01)
*G06N 20/00* (2019.01)
*H04N 21/25* (2011.01)
*H04L 65/80* (2022.01)

(52) U.S. Cl.
CPC ......... *H04N 21/2407* (2013.01); *G06N 20/00* (2019.01); *H04L 65/80* (2013.01); *H04N 21/2404* (2013.01); *H04N 21/251* (2013.01)

(58) Field of Classification Search
CPC .......... H04N 21/2407; H04N 21/2404; H04N 21/251; H04L 65/80; G06N 20/00; G06Q 10/0635
See application file for complete search history.

(56) References Cited

U.S. PATENT DOCUMENTS

| | | | | |
|---|---|---|---|---|
| 10,778,354 | B1* | 9/2020 | Hegar | H04H 60/37 |
| 2004/0049473 | A1* | 3/2004 | Gower | G06Q 10/06 |
| | | | | 706/46 |
| 2006/0080717 | A1* | 4/2006 | Barzilay | H04N 21/4627 |
| | | | | 725/100 |
| 2010/0306038 | A1* | 12/2010 | Harris | G06Q 30/00 |
| | | | | 705/14.1 |

(Continued)

*Primary Examiner* — Joshua D Taylor
(74) *Attorney, Agent, or Firm* — Volpe Koenig

(57) ABSTRACT

A method and system may input telemetry into a data structure. The telemetry may comprise a plurality of measurement results or other data collected from remote network nodes. Subscriber use metrics may be determined from the telemetry. From the use metrics and habits of the subscriber, user characteristics may be determined. A likelihood of service cancellation, based on the user characteristics, may be estimated in an embodiment. In another embodiment, a likelihood of receiving an inquiry from the subscriber at a subscriber support center may be estimated. Service enhancements may be proactively provided to the subscriber, based on the telemetry, the subscriber use metrics and the user characteristics in advance of service cancellation or receiving the inquiry. Last mile equipment may provide telemetry. The last mile equipment may include set top boxes, cellular phones, tablets and the like.

20 Claims, 22 Drawing Sheets

(56) References Cited

U.S. PATENT DOCUMENTS

| | | | |
|---|---|---|---|
| 2013/0054306 A1* | 2/2013 | Bhalla | G06Q 30/02 705/7.31 |
| 2014/0089993 A1* | 3/2014 | Huysegems | H04L 65/1069 725/86 |
| 2014/0281458 A1* | 9/2014 | Ravimohan | G06F 9/4401 713/2 |
| 2016/0080237 A1* | 3/2016 | Halepovic | H04L 65/80 709/224 |
| 2017/0352187 A1* | 12/2017 | Haines | G06F 16/48 |
| 2019/0213511 A1* | 7/2019 | Higgins | G06Q 30/0204 |
| 2019/0266622 A1* | 8/2019 | Turnbull | G06N 20/00 |
| 2019/0306566 A1* | 10/2019 | Zaatarah | G06F 1/1694 |
| 2019/0313155 A1* | 10/2019 | Becker | H04N 21/44224 |
| 2020/0175590 A1* | 6/2020 | Huo | G06Q 40/04 |

* cited by examiner

| Pros | Cons |
|---|---|
| Personalized Experiences | 18% Churn |
| Real-time User Feedback | Poor Quality |
| Quick to Launch | Loss of Control |
| Easy to Scale | Latency Problems |
| Strong DRM | Global Competition |
| Multi-Platform | Complex Business Models |
| Linear and Nonlinear | DIY with Direct to Consumer |
| Global Reach | Short-Form and VOD Preference |
|  | Limited Standarts and Regulation |
FIG. 5
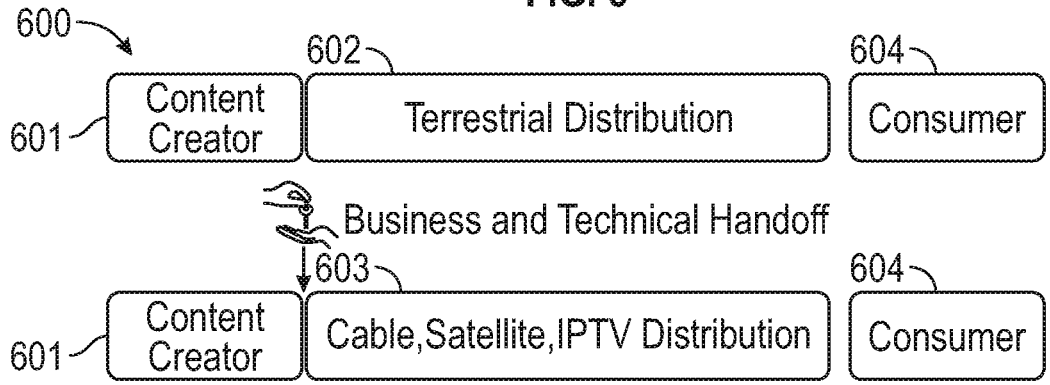
FIG. 6
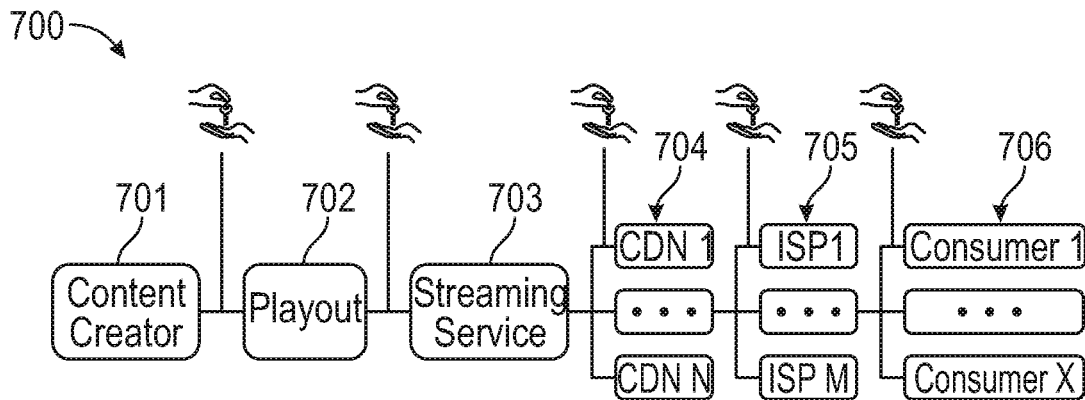
FIG. 7

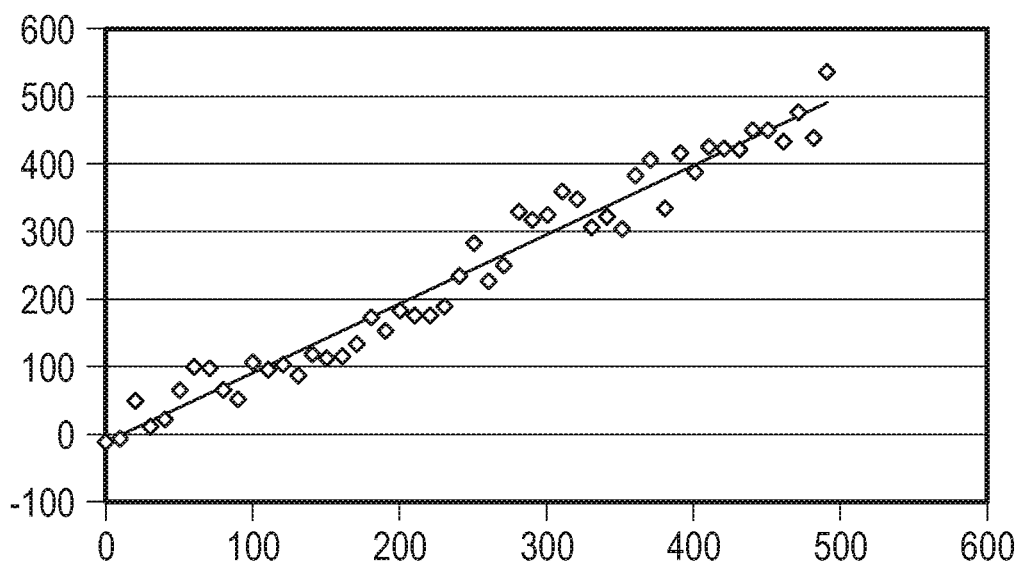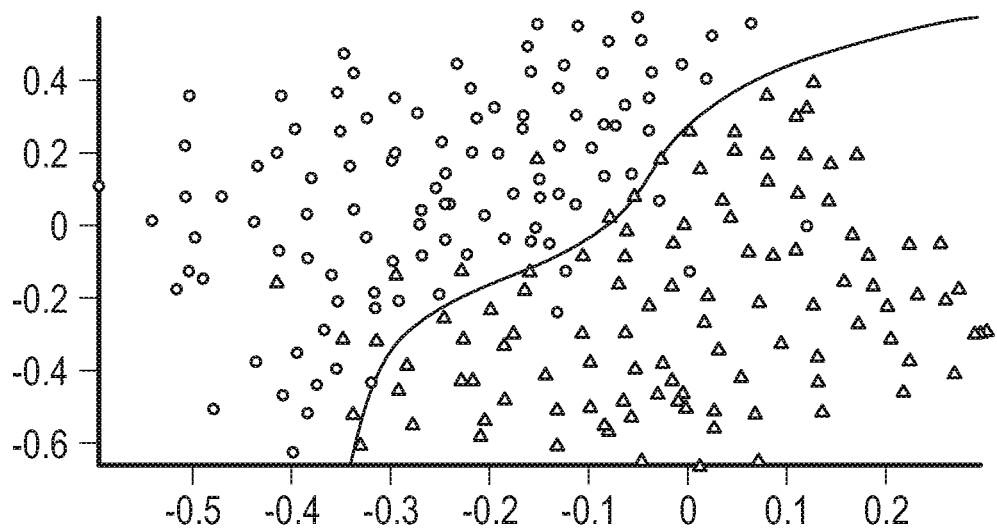
FIG. 11

PROVIDING RISK BASED SUBSCRIBER ENHANCEMENTS

CROSS REFERENCE TO RELATED APPLICATION

This application claims the benefit of U.S. Provisional Application No. 62/830,072, filed Apr. 5, 2019, which is incorporated by reference as if fully set forth.

BACKGROUND

Content owners maintain little control upon turning their product over to content service providers including over the air (OTA), cable, satellite, and Internet protocol television (IPTV) service providers. In particular, content owners may maintain even less control when their content is provided via content distribution networks and over the top (OTT) service providers. To complicate matters, content owners lack insight into a viewer's quality-of-experience (QoE) as more and more 3rd party services become part of an end-to-end distribution solution. Content owners may find themselves not knowing what exactly is coming out at the subscriber end. New methods are needed to expose this vacuum of information and ensure a high quality product is provided via proper measurement of viewer engagement.

SUMMARY

A method and system may input telemetry into a data structure. The telemetry may comprise a plurality of measurement results or other data collected from remote network nodes. Subscriber use metrics may be determined from the telemetry. From the use metrics and habits of the subscriber, user characteristics may be determined. A likelihood of service cancellation, based on the user characteristics, may be estimated in an embodiment. In another embodiment, a likelihood of receiving an inquiry from the subscriber at a subscriber support center may be estimated. Service enhancements may be proactively provided to the subscriber, based on the telemetry, the subscriber use metrics and the user characteristics in advance of service cancellation or receiving the inquiry. Last mile equipment may provide telemetry. The last mile equipment may include set top boxes, cellular phones, tablets and the like. Probes may be software or hardware based devices and may be resident in applications or operating systems on the equipment.

BRIEF DESCRIPTION OF THE DRAWINGS

FIG. 5 is a table which illustrates pros and cons of OTT delivery;

FIG. 6 is an illustration of a traditional linear service provider mix;

FIG. 7 is an illustration of an OTT Service Provider Mix;

FIG. 11 includes two graphs which illustrate classification vs. regression methods;

DETAILED DESCRIPTION OF THE PREFERRED EMBODIMENTS

The aggregation of quality of service (QoS), quality of experience (QoE) and viewer behavior data produces extremely large, but trusted data sets. Processing this data with sophisticated machine learning (ML) and Artificial Intelligence (AI) technologies is proving to be very effective in extracting maximum value from the content and advertising. Methods and systems disclosed herein may be integrated with emerging technologies and best practices for harnessing the power of cloud computing, AI and massive datasets to improve the viewer experience and maximize revenue from every viewing platform.

The media delivery business has become a game of seconds. The lines have blurred between broadcast and other Internet protocol (IP) related services for delivering media. Content creation is growing from original television (TV) series and movies, to how-to videos and social media posts. Access to content for consumers seems limitless. Analysts have stated we are in the era of "infinite" media.

Digital media in the form of audio and video is the preferred medium for nearly all our daily activities including: entertainment, sports, gaming marketing, promoting, advertising, shopping, reviews, education, inspiration/ideas, connecting and even general communication.

With so much content being consumed for a wider variety of purposes, viewing time and attention has grown shorter, thus making every second count. A 99.9% service availability was once a good number with a captive audience, but in today's fragmented world that leaves 31,536 precious seconds on the table each year.

Media consumption has increased overall but has steadily decreased from the TV set since about 2010 with the increasing use of smartphones and tablets. This adds the challenges of finding where consumers are and determining the right-sized content they want to consume.

Figure 1:
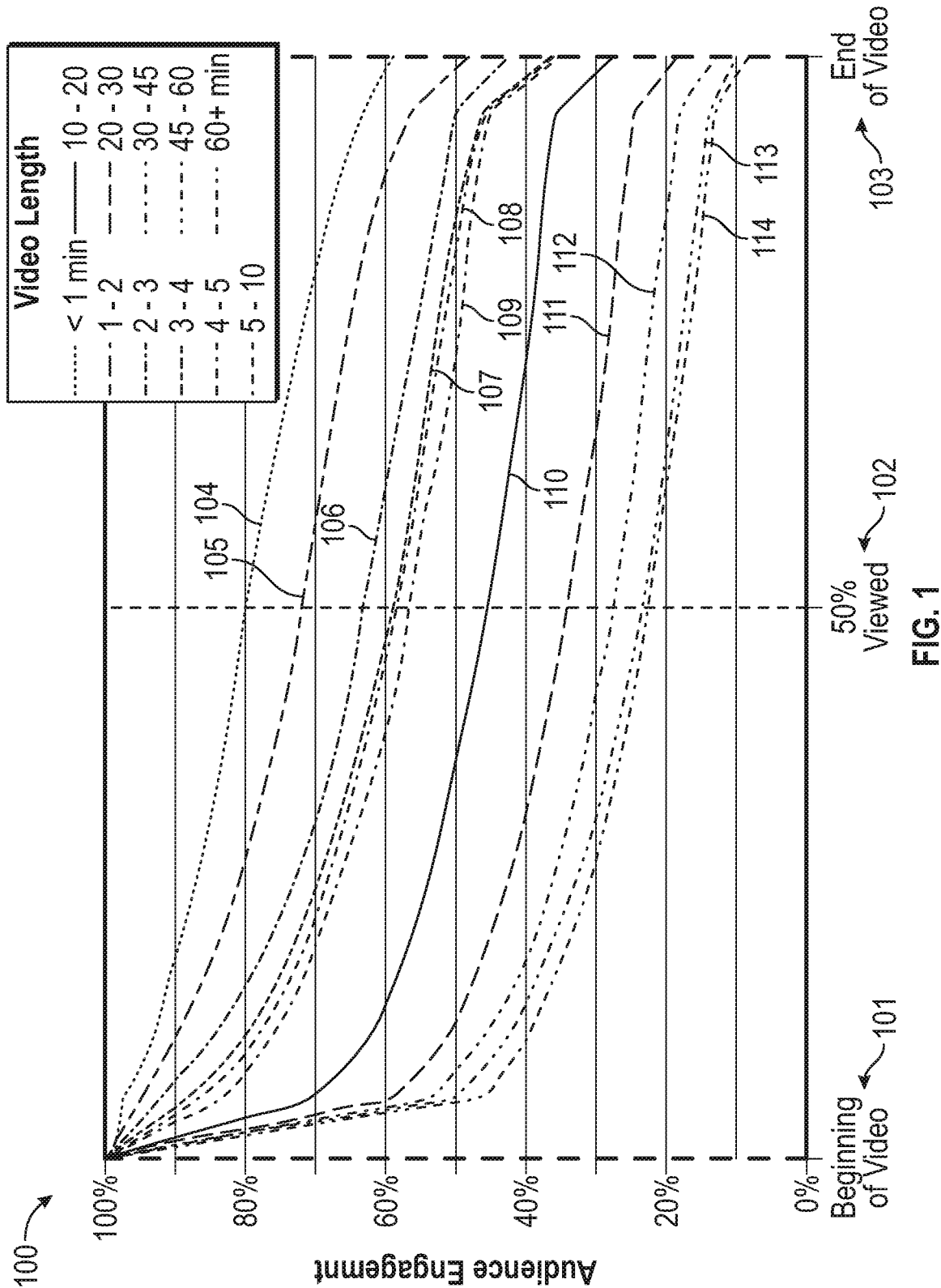
FIG. 1 is an illustration of audience engagement between the beginning of a video and the end of a video.

FIG. 1 is an illustration 100 of audience engagement between the beginning of a video 101, 50% view mark of a video 102 and the end of a video 103. Over time, audience engagement drops in line with video length. For example, audience engagement of a 60+ min video 114 falls faster than audience engagement of a film which is less than one minute long 104 and others which are only a few minutes long, for example, a 1-2 minute long video 105 and a 2-3 minute video 106. Various other video lengths are illustrated in FIG. 1, for example, a 3-4 minute video 107, 4-5 minute video 108, 5-10 minute video 109, 10-20 minute video 110, 20-30 minute video 111, 30-40 minute video 112 and 45-60 minute video 113.

Figure 2:
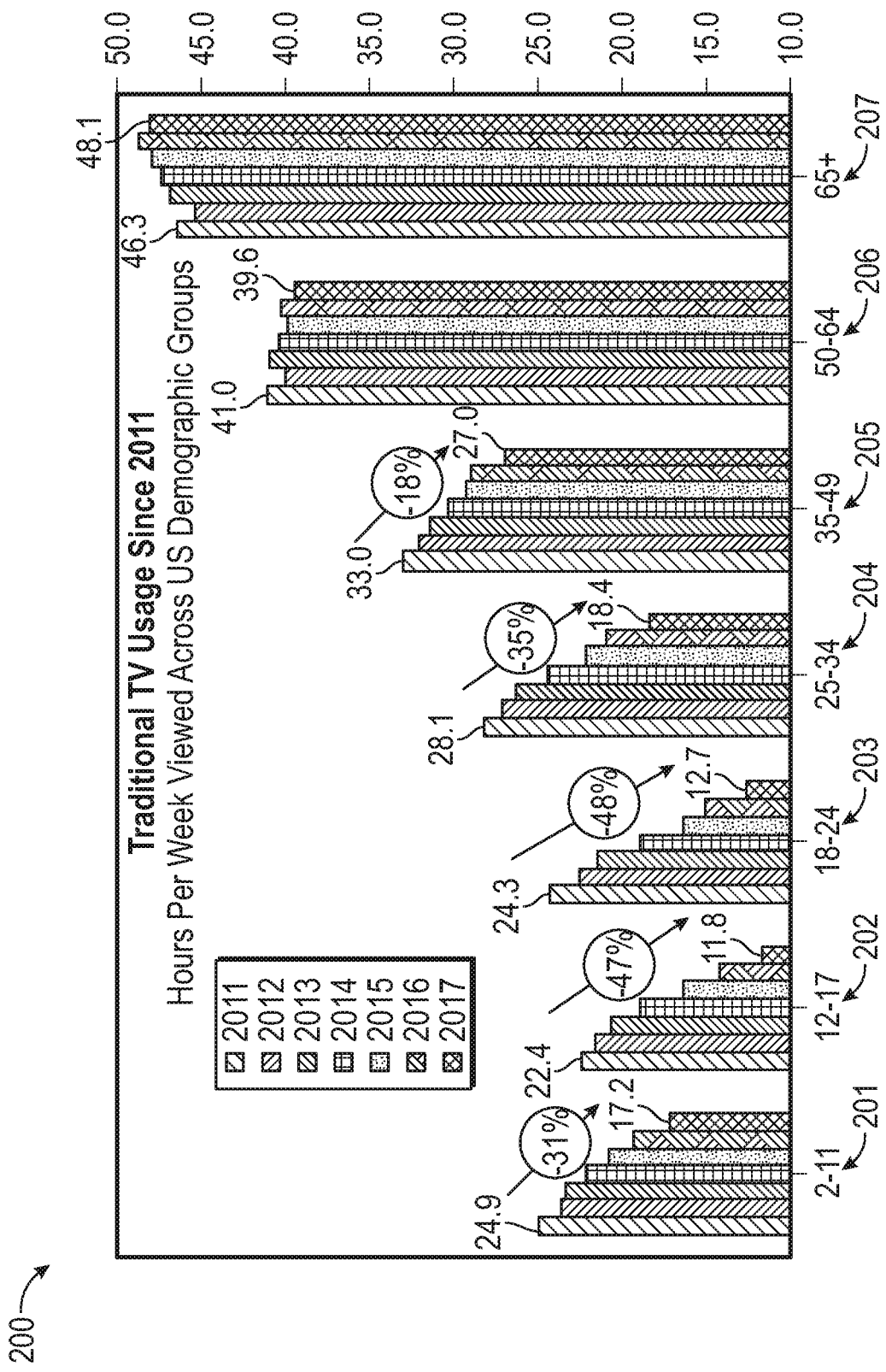
FIG. 2 is an illustration of traditional television (TV) usage between 2011 and 2017.

FIG. 2 is an illustration 200 of traditional TV usage since 2011. In FIG. 2, the x-axis shows age groups 201-207 and y-axis shows hours of television watched per week. Among a younger audience, i.e. individuals between 2 and 49 years of age, traditional television usage is falling. Usage by individuals between 2 and 11 years of age 201 has decreased at −31%. Usage by individuals between 12 and 17 years of age 202 has decreased at −47%. Usage by individuals between 18 and 24 years of age 203 has decreased at −48%. Usage by individuals between 25 and 34 years of age 204 has decreased at −35%. Usage by individuals between 35 and 49 years of age 205 has decreased at −18%. Usage by individuals between 50 and 64 years of age 206 remains relatively flat, while individuals over the age of 65 207 are watching slightly more traditional television.

The main contributor to the rapid expansion of content creation and consumption is Over the Top (OTT) delivery. OTT delivery is made possible via broadband access to a wide range of "connected" devices, including smartphones, tablets, smart TVs, video game consoles, streaming sticks and the like. This model gives consumers access, convenience and value that isn't available via traditional linear services.

Unfortunately, OTT is "Over the Top" of everything else that currently exists today. The entire broadcast model is working to adapt, but nothing quite works the same as before (prime-time, 30-second spots, ratings, even the definition of live). However, cable, satellite, Internet protocol television (IPTV) and Over the Air (OTA) delivery may not completely disappear. Each will find their place in this new media delivery ecosystem, as will all current methods of monitoring, measuring and analyzing. There may always be a need for a general linear broadcast and even a "First Mover" of sorts. There will also be a need to handle a variety of specific cases, such as personalization. Embodiments disclosed herein are equally applicable to any delivery technology, for OTA, cable, satellite, IPTV and the like. These technologies may benefit from the disclosed methods and systems by helping reduce subscriber churn.

Figure 3:
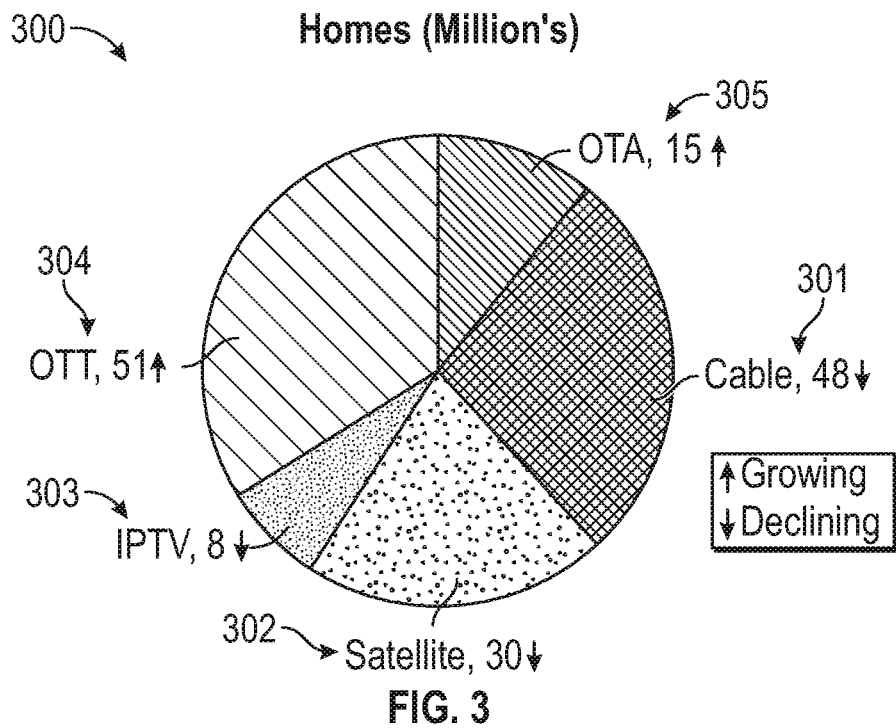
FIG. 3 is a pie chart which illustrates an approximate mix of media services provided to United States (US) homes.

FIG. 3 is a pie chart 300 which illustrates an approximate mix of media services provided to US homes. FIG. 3 illustrates that roughly 48 million US homes are serviced via cable 301, 30 million US homes are serviced via satellite 302 and 8% of homes are serviced by IPTV 303. The use of each of these services is falling while OTT 304 and OTA 305 are rising. OTT 304 is used by 51 million US homes and OTA 305 is used by 15 million homes.

There is no silver bullet which causes any particular service usage to fall. It is not solely about demographics, content type, purpose, or delivery convenience, nor is it about the recommendation, branding, or viewing quality. It is a complex equation of time-critical factors important to each individual. All of the above matters for each viewer as they consume content throughout their normal daily activities.

One question stands, "how do you compete in a world saturated with content all trying to capture the attention of a fickle and fragmented audience?" The answer may require a mix of traditional linear services along, new OTT services, and a strong data-driven approach. These traditional linear services and new OTT services may be monitored, measured and analyzed together to improve overall viewing quality.

OTT is not exclusive to audio and video delivery in the broadcast industry. It also includes messaging, social media, websites, and any other form of communications that are carried over a third party broadband connection. OTT also opens the door to reaching a "Global" audience. All of these service offerings are important considerations while understanding the overall OTT ecosystem. They compete for the same audience and, more importantly, we can learn from the techniques and technologies they successfully deployed.

Major players in the OTT services market include: Twitter Inc.; Hulu, LLC.; Netflix, Inc.; Facebook, Inc.; Rakuten, Inc.; LinkedIn Corporation; Evernote Corporation; Apple, Inc.; Amazon Inc.; Skype (Microsoft Corporation); Google, Inc.; Dropbox, Inc.

It is easy to pick out Facebook Amazon Apple Netflix Google (FAANG) from the list above as they are becoming formidable new entrants in what was once an exclusive industry of broadcast professionals. FAANG are also early pioneers in Cloud, Big Data and Artificial Intelligence technologies, giving them an advantage.

Figure 4:
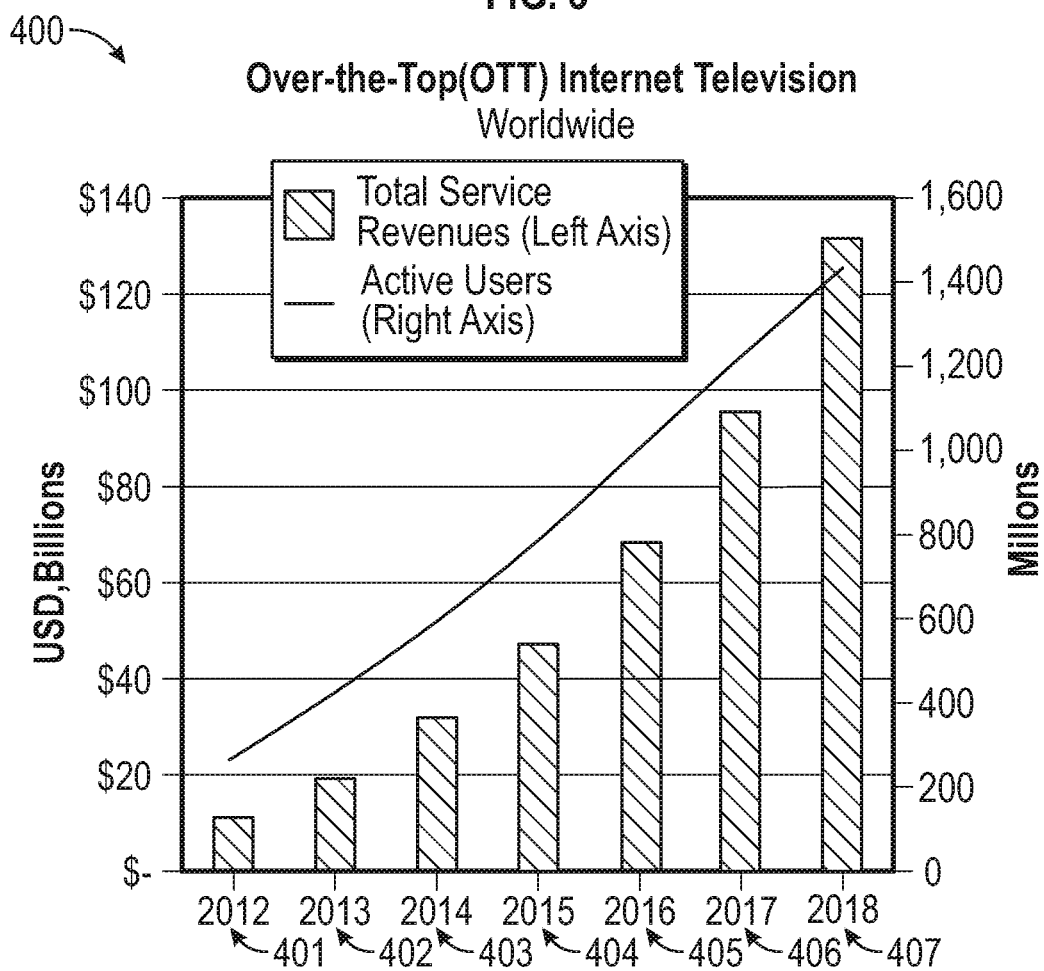
FIG. 4 is a bar chart which illustrates over the top (OTT) growth between 2012 and 2018.

FIG. 4 is a bar chart 400 which illustrates OTT growth between 2012 and 2018 401-407. As can be seen during this period, OTT growth was roughly linear and tremendous growth potential exists in OTT for the media and entertainment sector. Growth is projected to exceed $158 billion worldwide by 2025.

OTT delivery provides the unique characteristic of a one-to-one personalized experience and the ability to collect immediate feedback. OTT may also allow a quick launch and scale to reach a global multi-platform audience with any form linear or nonlinear content. To satisfy this need, content creators may need to determine the right content, right duration, right time and right platform to reach their audience in real-time. Personalization examples include searches and recommendations based on history, actor or director. Other personalization information may include the content which a subscriber would like to see on a particular device at a particular time of the day; payment preferences (i.e. subscription-ad mix); how ads are presented such as pre-roll, inserts in the content, or banners; and bookmarks to review a product later, join related communities with people of similar interests, etc. Regardless of the end goal, the first question in any decision tree for any delivery technology or topology should be, "Is the quality great?" Without knowing the answer to this first question, none of the other answers to engagement questions will be valid.

FIG. 5 is a table 500 which illustrates pros 501 and cons 502 of OTT. The pros 501 include: personalized experiences, real-time user feedback, quick to launch, easy to scale, strong DRM, multi-platform, linear and nonlinear, global reach. The cons 502 include an 18% churn, poor quality, loss of control, latency problems, global competition, complex business models, DIY with direct to consumer, short-form and video on demand (VOD) preference and limited standards and regulation.

For the media and entertainment industry, OTT may provide a competitive advantage. OTT has strengths, but is not perfect. OTT has an 18% churn rate, and most consumers have more than one streaming video on demand (SVOD) subscription in an effort to create their own personalized programing bundles.

Studies consistently place poor quality in the top four reasons why viewers abandon video. Video abandonment is alarming, but this problem has existed since the remote control and DVR; it just could not be measured until now. With short form content consumption on the rise, even short duration problems become very noticeable. For example, imagine a five-second delay in a four-second pre-roll ad. OTT delivery may have the same issues as normal digital video delivery but with the addition of problems related to sending video over a packet switched network and multi-profile adaptive bitrates.

FIG. 6 is an illustration 600 of a traditional linear service provider mix 600. Traditionally, the mix included a content creator 601 providing content for terrestrial distribution 602 to the consumer 604. More recently, the content creator 601 may have to provide content for distribution via multiple sources including cable, satellite and IPTV distribution 603 to the same consumer 604. In FIG. 6, key collection may be performed once, downstream from the content creator 601 when cable, satellite, IPTV distribution 603 is used.

OTT is even more complicated because it is more difficult to control end to end than traditional approaches. Over the Air broadcasters once controlled the entire chain through their transmitters, while Cable, Satellite, and IPTV distribution offered a single handoff technically and commercially. Then it was in the best interest of the provider to provide the best quality experience possible.

For OTT, playout is moving to a cloud via 3rd party providers, as is the streaming service (Transcoding, Packaging, DRM, Origination, etc.). Meanwhile, multi-CDN and multi-internet service provider (ISP) solutions are fast becoming the norm for reliable delivery and reaching consumers on-the-go. This is a smart approach as it gains incredible scale and speed to market, but it comes with a cost: loss of control.

There may potentially be several hand-offs with OTT between third party service providers thus making an end-to-end/holistic data aggregation and monitoring system a "must-have" for a successful OTT channel.

FIG. 7 is an illustration 700 of an OTT service provider mix 700. Content may be created by a content creator 701 and may be played out 702 over a streaming service 703. The streaming service may employ 1 . . . N content distribution networks 704 corresponding to 1 . . . M internet service providers 705. Each ISP may distribute the content to one or more consumers 706 on their networks. In FIG. 7, key collection may be performed at multiple stages during distribution. For example, kay collection may be performed after content is provided from the content creator 701, after playout 702, after output from a streaming service 703 and prior to CDN 704, prior to ISP 705, and prior to being provided to a consumer 706.

Very little standardization exists or has been adopted for OTT. Regulation remains focused more on traditional broadcast and not on the evolving OTT. There is also a recent push for low-latency OTT delivery, which will cause another round of growing pains and problems until everything settles again.

Branding means more today than ever. Brand Sharing has gained momentum as a way to deliver the best possible experience. Instead of showing a 30-second Ad at every opportunity, a brand agreement for revenue sharing is worked out. That monetization extends well beyond subscription or an ad placement. With increasingly complex business models, it now falls back onto the network, content creators, and advertisers to ensure their content was delivered as expected and a sufficient audit trail exists to reconcile these more complex agreements.

Several other trends are evolving such as original content creation, global audiences, and direct-to-consumer (DTC). This too pushes the fight for eyeballs further upstream and of interest to more than one party.

The best way to optimize any content for delivery, including OTT content, is to start with high-quality delivery to a target audience and respond to the feedback in real-time. To achieve this, new technologies may be used to look for answers, most notably Artificial Intelligence (AI)—or AI technologies.

AI has been talked about for decades, but adoption and useful results have been a rollercoaster ride. AI didn't really become a reality until cloud, big data, and IoT enabled the capture, store and processing of vast quantities of data.

Figure 8:
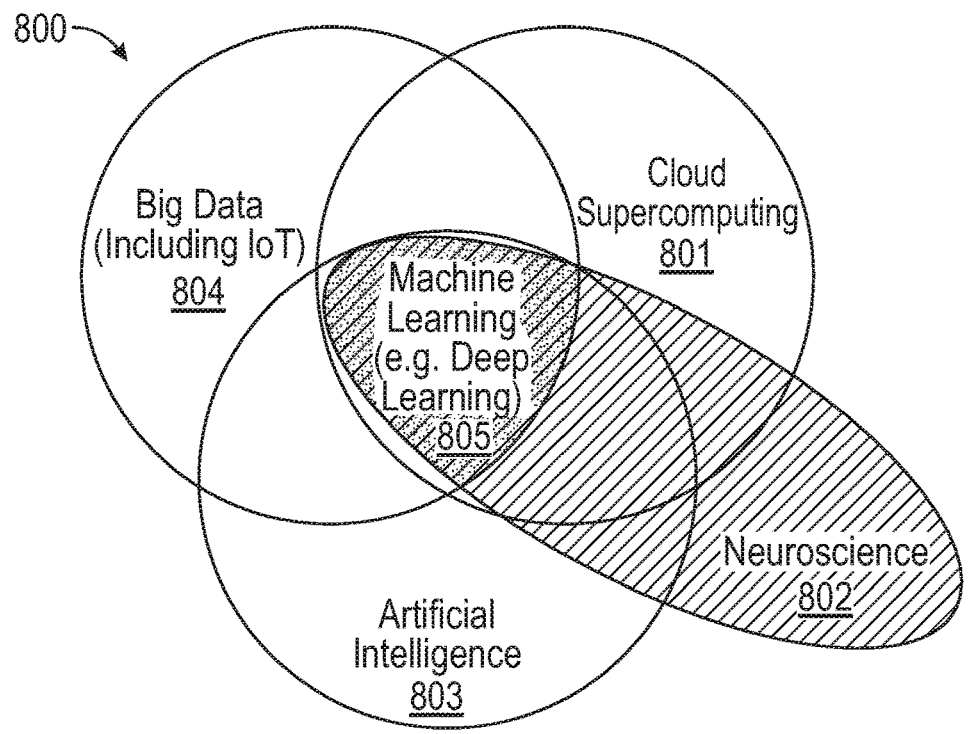
FIG. 8 is a Venn diagram which illustrates example mega trends of artificial intelligence (AI)

FIG. 8 is a Venn diagram 800 which illustrates example mega trends of AI. In FIG. 8 machine learning 805 is shown to be an intersection of cloud supercomputing 801, neuroscience 802, artificial intelligence 803 and big data 804.

Large datasets can hide a lot of potential value, but it has become a challenge to find patterns, trends, and anomalies in these datasets. The rise of data science as a multidisciplinary field of study grew from the interest of organizations as they seek to gain competitive advantages from hidden knowledge. Methods and approaches from computer science, mathematics and statistics have been joined together to extract and interpret knowledge. Approaches vary from Data Warehousing and Online Analytical Processing (OLAP) to Data Mining and Machine Learning (ML).

Figure 9:
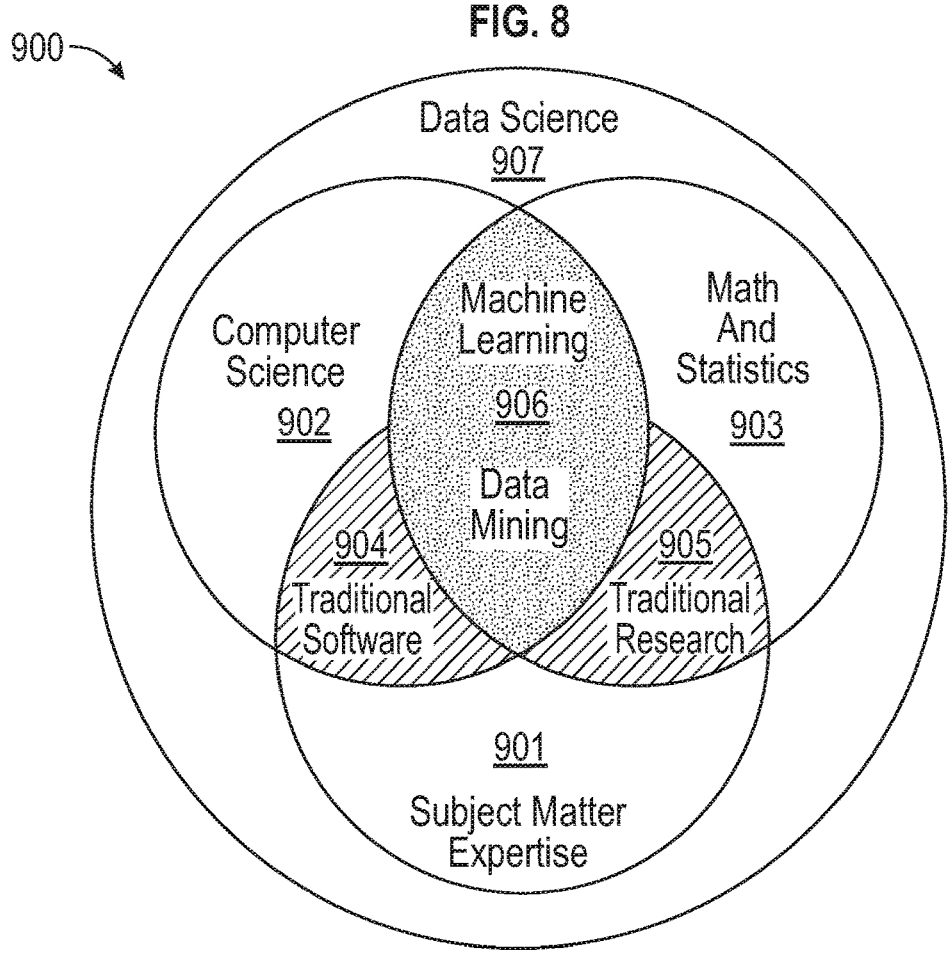
FIG. 9 is a Venn diagram which illustrates that data science is a combination of subject matter expertise, math and statistics and computer science.

FIG. 9 is a Venn diagram 900 which illustrates that data science 907 is a combination of subject matter expertise 901, math and statistics 903 and computer science 902. Traditional software 904 may only consider subject matter experience 901 and computer science 902. Traditional research 905 may only consider math and statistics 903 coupled with subject matter expertise 901. On the other hand, once subject matter expertise 901, math and statistics 903 and computer science 902 are combined, artificial intelligence, i.e. machine learning and data mining 906, becomes capable.

Data mining applications are good candidates for prediction tasks. Trying to determine future outcomes based on estimations from historic data can be as simple as guessing the classification of the next inputs. One of the practical reasons to exercise Data Mining techniques might be to identify customers who are not presently enjoying their service and to predict the possibility of them cancelling their subscription.

Data Mining may be defined as the process of discovering patterns in data, either automatically or semi-automatically. This process is supported by tools and practical techniques, also known as Machine Learning, which are used to identify the underlying structure of the data. This structure is then represented in a comprehensible manner for use in Data Mining applications. Pattern descriptions are considered the output of a learning process.

Machine Learning techniques have been used to solve various tasks of classification, regression, clustering, identification, filtering, prediction and knowledge discovery. There is a set of machine learning algorithms to address each task and these algorithms are typically divided into following categories: Reinforcement Learning; Supervised Learning; Unsupervised Learning; and Semi-supervised Learning.

Reinforcement Learning is one of the most complicated approaches. In order to maximize its performance, it allows a software agent to determine the ideal behavior within a specific context. A simple reward feedback (reinforcement signal) is required for the agent to learn its behavior.

Supervised learning (human assisted), unsupervised learning (algorithm assisted), and semi-supervised learning (mix of both) are used to solve clustering tasks.

Data categorizing may include clustering of tasks automatically and assigning observations into subsets. For example, unsupervised learning can be used in categorizing customers based on their consumption habits.

Figure 10:
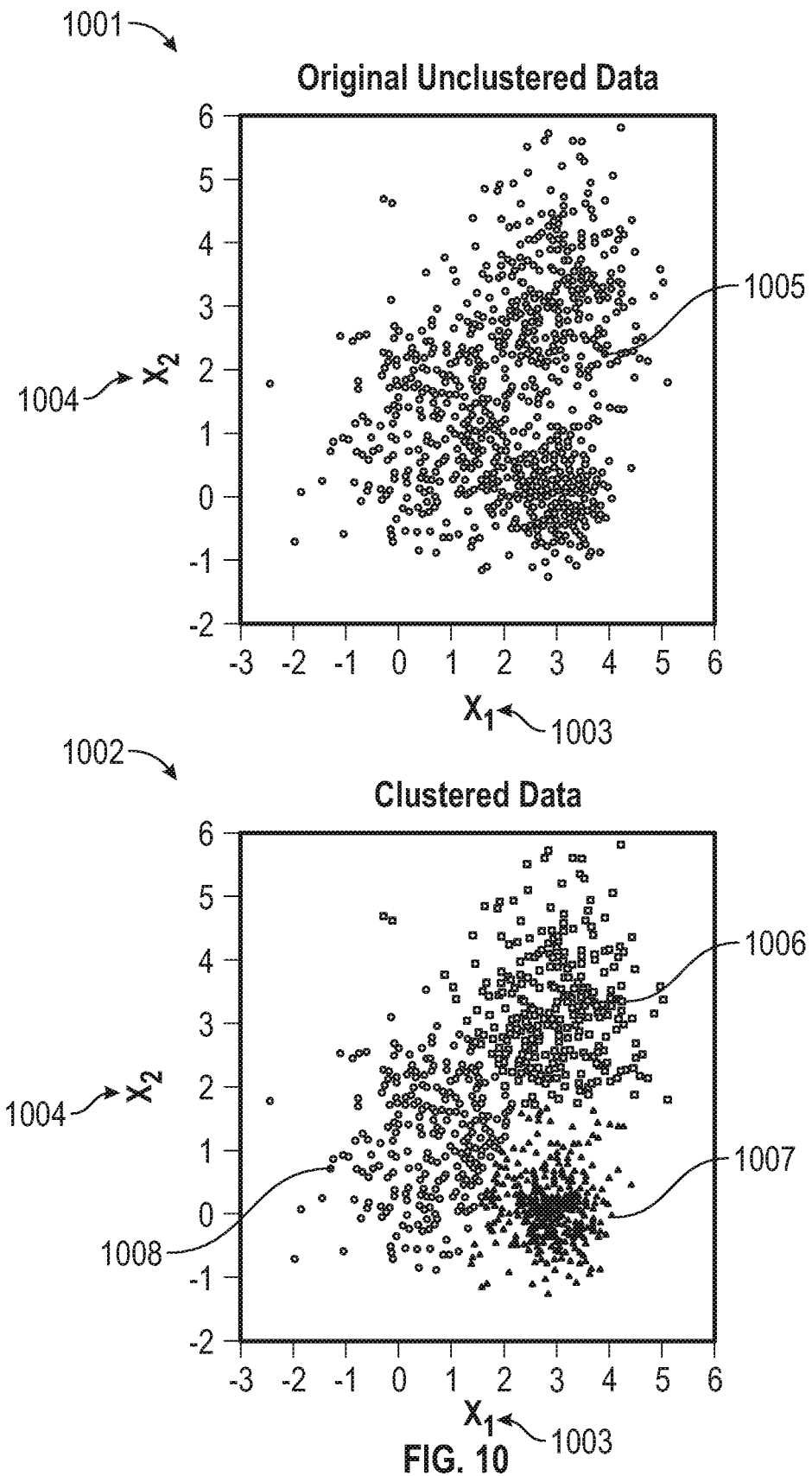
FIG. 10 is an illustration of example clustering techniques.

FIG. 10 is an illustration of an example clustering technique. In graph 1001, unclustered data is spread over X1 1003/X2 1004. The unclustered data is shown as a single circle shape 1005.

Graph 1002, on the other hand, shows the same data elements of graph 1001, shown in multiple shapes, which include a circle 1008, triangle 1007 and square 1006. In the embodiment shown in FIG. 10, clustering is generally (but is not perfectly) performed in terms of point location.

Several proven clustering methods exist which are common to unsupervised learning. Examples include k-means, Gaussian Mixture Model (GMM), and Spectral Clustering. There are also unsupervised learning methods based on Deep Learning (DL).

Supervised learning methods may perform classification or regression tasks. Regression and classification are both related to prediction, where regression predicts a value from a continuous set, whereas classification predicts the 'belonging' to the class. FIG. 11 includes two graphs 1101, 1102 which illustrate a regression approach and a classification approach, respectively. An example using a classification approach 1102 would be labeling customers who are known to have churned as (1), and others as (0). With this known data, a function may be constructed that separates these two categories of customers. Then an attempt to predict the category of an unknown customer may be made. An example using a regression approach 1101 would be trying to estimate the probability of churn for any customer at a given moment of time based on history of quality of content delivery issues he/she experienced. This regresses the function $y=F(t)$ where y is an estimated probability of churn.

Before data may be processed by machine learning algorithms, features must first be defined. A feature is an individual characteristic of a pattern being observed that can be measured. Choosing informative, discriminating and independent features is a crucial step for effective algorithms in pattern recognition, classification and regression. There are two main approaches to data processing in machine learning—feature engineering and feature learning.

Figure 12A:
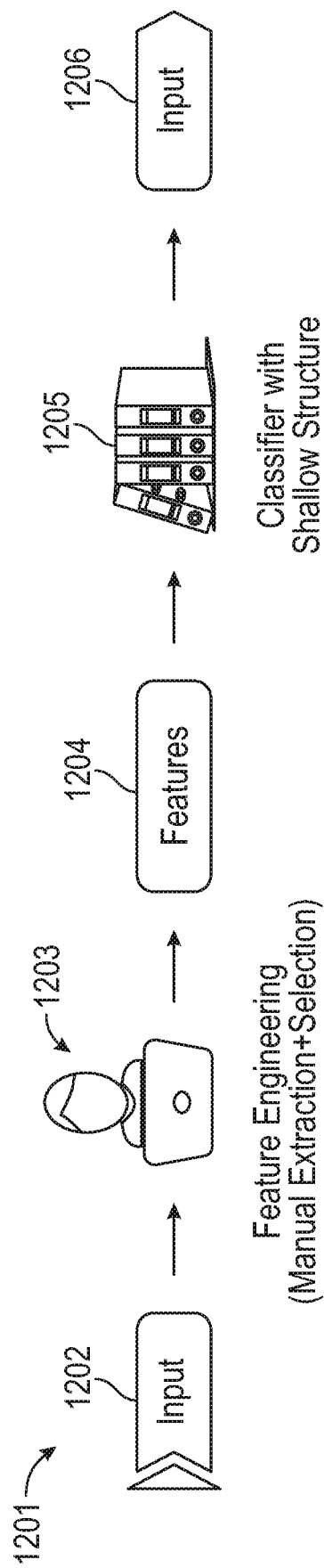
FIG. 12A is a flowchart which illustrates feature engineering.

FIG. 12A is a flowchart 1201 which illustrates feature engineering. Feature engineering is a classical approach that uses data scientists to first prepare the features, and then select the model expected to work best with those features. These models can include ensembles of decision trees, for example, using hundreds or thousands of decision trees. The main principle behind the ensemble model is that a group of weak learners come together to form a strong learner. The flowchart 1201 begins with receiving raw input data 1202. Data scientist 1203 analyses raw data 1202 and determines methods of pre-processing raw data 1202 to create different set of data—features 1204, which based on his/her domain knowledge are better suited (more efficient) for machine learning. Pre-processing may include averaging, scaling, combining, transforming etc. Data scientist 1203 also selects machine learning model 1205, which again based on his domain knowledge and on created features 1204 would be most efficient for this task. Features 1204 and model 1205 may become inputs 1206 for machine learning algorithms.

Figure 12B:
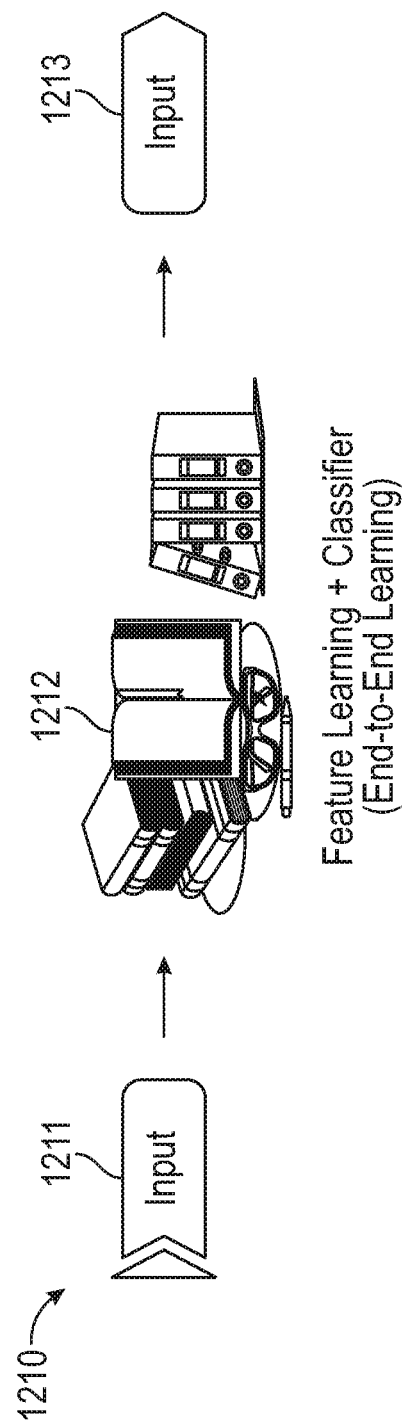
FIG. 12B is a flowchart which illustrates feature learning.

FIG. 12B is a flowchart 1210 which illustrates feature learning. Feature learning is relatively new and is typically performed with deep learning. The idea is to automatically learn a set of features from raw data and automatically select a model for machine learning. The main advantages of feature learning (deep learning) are that it can avoid the manual process of handcrafted feature engineering and can learn some hidden relations in the raw data with less preparation. In flowchart 1210, raw input data 1211 may go to a feature learning engine 1212, which generates a set of features and selects a machine learning model. Generated features and selected model may become inputs 1213 for machine learning algorithms.

The choice of AI techniques to be used in data mining applications depends on several factors, including but not limited to the raw data available and the use case to be addressed. One of the critical tasks to be solved in AI applications is to pick the right set of tools and techniques. With the help of a Data Scientist, the project tasks have to be decomposed into subsequent tasks that can be solved by a certain machine learning technique. Selection of the proper model or technique requires investigation of the data. However, the data should first be cleaned, transformed and properly ingested into the system, thus creating a pipeline for the data to follow before it can be effectively used. The data then has to be prepared for in-depth analysis.

Figure 13:
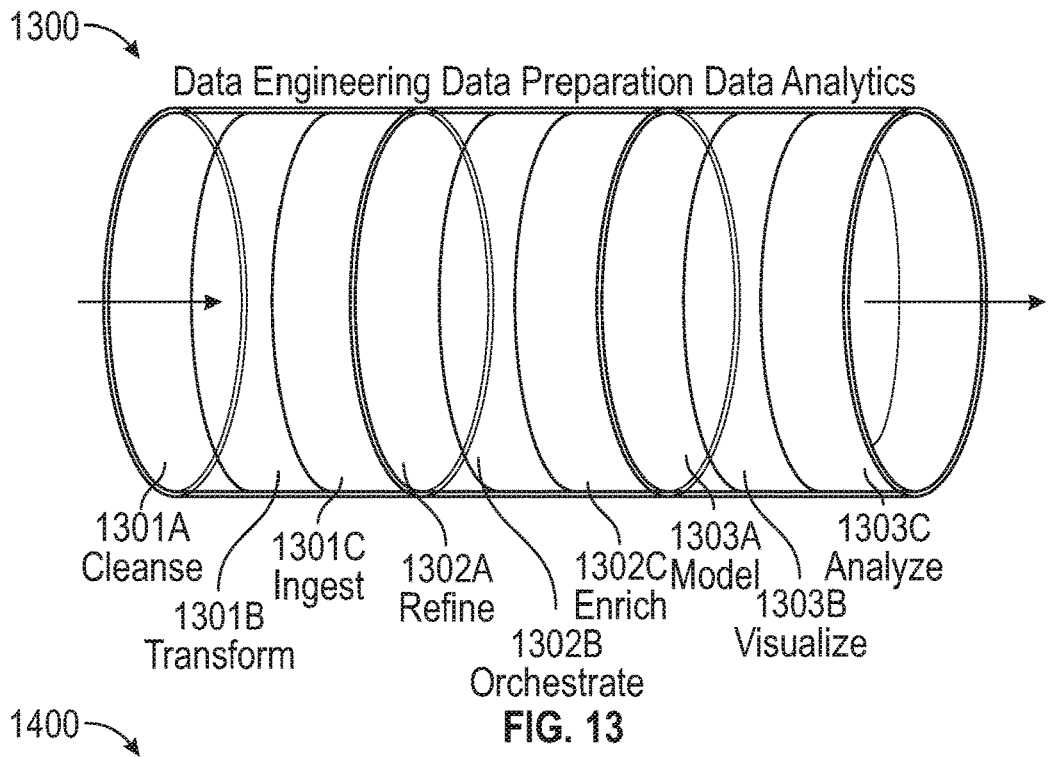
FIG. 13 is an illustration of a data analytics pipeline.

FIG. 13 is an illustration of a data analytics pipeline 1300. The pipeline 1300 may include data engineering 1301, for example, cleansing 1301A, transforming 1301B and ingesting 1301C data; data preparation 1302, for example, refining 1302A, orchestrating 1302B and enriching 1302C data; and data analytics 1303 including modeling 1303A, visualizing 1303B and analyzing 1303C data.

In data mining, the path to a solution is nonlinear. The process includes iteratively exploring, building and tuning many models. The process typically starts with feature extraction from the source data based on the domain knowledge and ends with an evaluation of the model. During the training stage in machine learning, the model's weights are updated based on input and ground truth data. During the prediction stage, the model outputs the category of each data sample. The process then repeats with the same problem, but with different models, to determine which model a better candidate.

Figure 14:
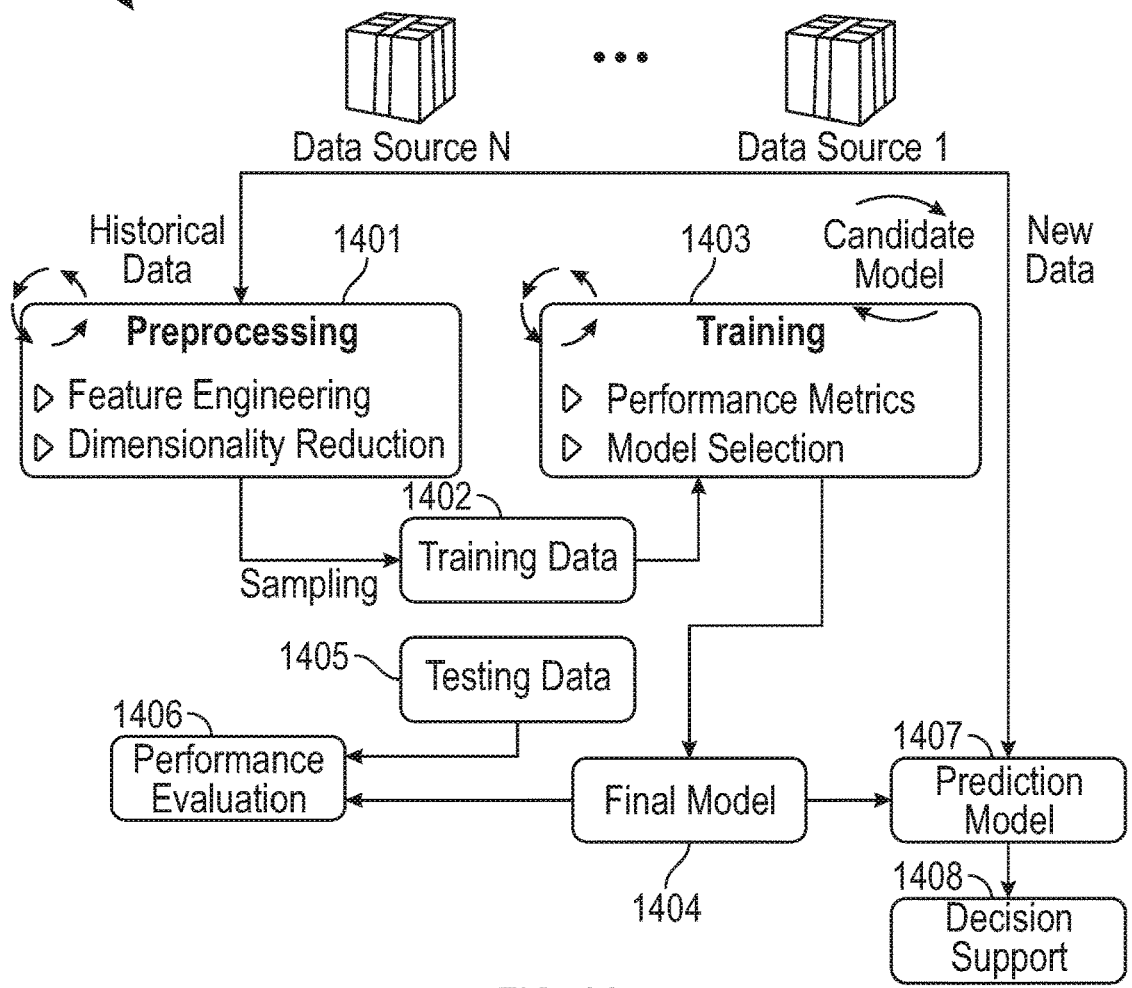
FIG. 14 is a flowchart of a machine learning process flow.

FIG. 14 is a flowchart of a machine learning process flow 1400. Historical data undergoes preprocessing 1401, which may include feature engineering and dimensionality reduction. The preprocessed data, or training data, is then used for training 1403. During training 1403, performance metrics are used to evaluate each candidate model and a Final Model 1404 is selected. Next, testing data 1405 is used for performance evaluation 1406 of the Final Model 1404. The Final Model 1404 may be established as the Prediction Model 1407. New data may then be used in the Prediction Model 1407 to provide decision support 1408.

A plurality of data sources may be used as input to a prediction model. Historical data (Data Source 1 . . . N) may be used as an initial training data set. After preprocessing 1401, cleaned training data 1402 may be used to train 1403 the learning Prediction Model. After learning is completed, new data goes to the model input. The Model makes a decision as to "At Risk" or "Not at Risk". Later, new data is augmented by actual subscriber behavior (whether he/she cancelled the service within certain period, i.e. one month, or not). Then this data may be used as training data to further refine the model. This process makes constant adjustments (updates) to the model improving prediction accuracy. Dynamic updates allow the model to automatically adapt to changing environmental conditions like changing subscriber taste, tolerance to issues, equipment changes, appearance of competitors, etc.

n an embodiment, predictive tickets may be auto-generated. Overall performance and reliability may be improved by identifying most problematic nodes, isolating bottlenecks and understanding the time-based cause and effect of network congestion.

A make vs. buy trade off may be considered. As with most applications, various off-the-shelf software tools exist which offer basic graphical and conceptual support for all phases of the knowledge discovery process. An example of this may be at the data collection part of the pipeline. Accurate tasks and datasets can be chosen for data collection. This eases the daily work of data mining experts and allows a growing number of non-experts to try and start knowledge discovery projects. Since every use case is unique, it is necessary to know how to use these components. There are always exclusions to the rules, errors in data, etc., raising the need for further analysis of data and fine tuning of the models. The challenge nowadays is to pick the right set of techniques and organize them into the pipeline producing the reasonable and valuable output. It is critically important to be able to validate and verify models and ask the right questions.

Cloud services are available, for example, AI as a Service (Cloud Machine Learning), and offer a range of data science services and machine learning frameworks including most of those already mentioned. These are especially useful when dealing with common types of AI such as image recognition and speech to text. The most common services are provided by: Amazon Web Services (AWS); Google Cloud Platform (GCP); Microsoft Azure; IBM Cloud.

Even with off the shelf services and technologies, the challenge then becomes more organizational when you have to make these technologies, techniques and flows work in a project environment. Whether you hire or outsource to acquire the right people, some critical skills are recommended.

A data engineer is someone who can collect and prepare data. A data scientist is someone who can choose and refine the model, validate and verify the output, and choose the best candidate for production. They also bridge the gap between Data Engineering and Subject Matter Experts. A data/business analyst may be someone who is familiar with the domain area and can explain the data and the results.

Figure 15:
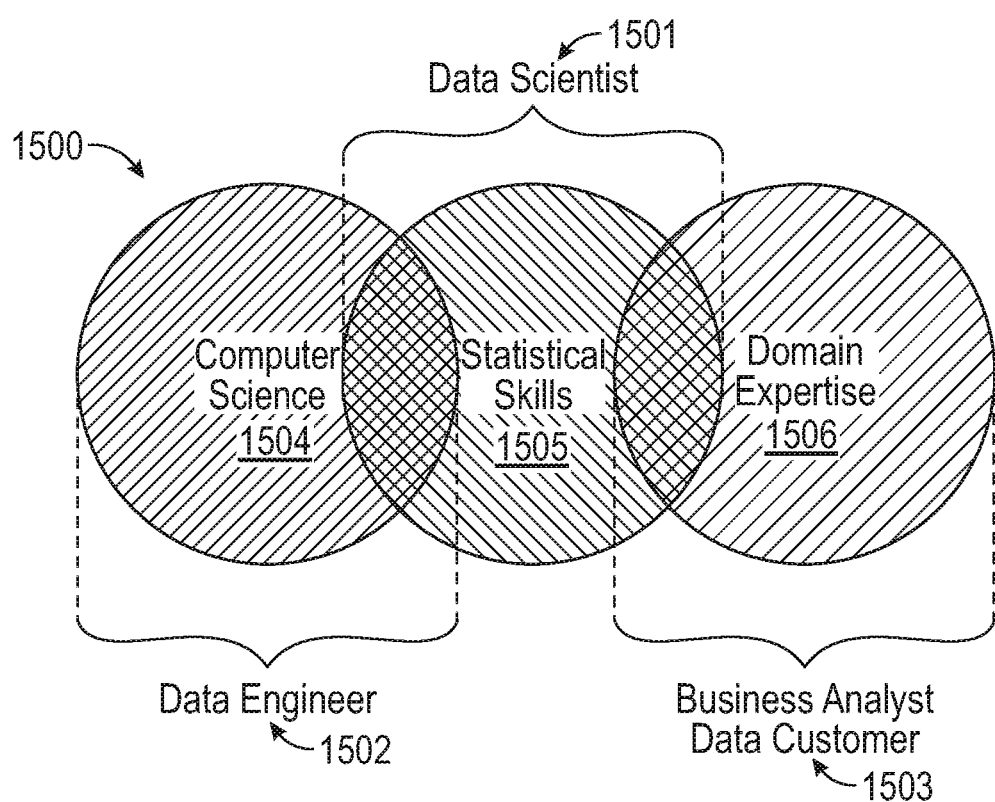
FIG. 15 is a Venn diagram which illustrates a skill set required of one expertly skilled in the art.

FIG. 15 is a Venn diagram 1500 which illustrates a skill set required of a data scientist 1501 expertly skilled in the art. A data scientist 1501 expertly skilled in the art should have a background in computer science 1504, have statistical skills 1505 and should have domain expertise 1506. One ordinarily skilled in the art should have a background which includes at least a subset of these arts. For example, a data engineer 1502 should have a background in computer science 1504. A business analyst data customer 1503 should have domain expertise 1506 and have statistical skills 1505.

Blockchain is becoming another interesting piece of enabling technology. With its inherent ability to verify a data source via distributed ledger technology, it enables a higher degree of transparency in data analytics. The input data can be automatically accepted or rejected on the basis of consensus verification. This addresses the concerns in the fourth "V" in Big Data, "Veracity" or data trust. Blockchain may also help with network security and Software Defined Networks (SDN). In some embodiments, Blockchain may be integrated herein.

One particular element of concern for network operators and content distributors is subscriber churn. Operators want to understand it, prevent it, and reverse it, but need a broader and deeper understanding of their end customers and their domain.

Subscriber Insights may include insights into: an identification of each "Silent Sufferer" vs. speculation; an informed rapid response tech support and customer care; a churn pattern analysis; a churn risk detection, prediction and prevention. An infrastructure investment strategy may comprise: network analysis & optimization; network modernization—i.e. migration to a Software Defined Network (SDN) to support a dynamically changing environment and behavior-based subscriber demands; dynamically managing Content Delivery Networks (CDNs), cache servers, and SDN bandwidth; determining the biggest bang for the buck, i.e., to determine the highest ROI.

New sources of data for Business Intelligence (BI) include: a grow average revenue per user (ARPU)—analyze behavior, identify changes, generate targeted offers, up sale; optimize inventory of Live, Scheduled, Non-linear and on-demand content; understand competitive and other external influencers; measure content performance for reuse and retirement; closed Loop Service Quality Management— Know, predict and proactively prevent.

Embodiments disclosed herein preserve video distribution quality, viewer engagement, and brand value through advanced analytics. A powerful cloud-based embodiment to monitor the quality of viewer engagement and protect media brand value across multiple delivery platforms is provided. In an embodiment, video content may be sampled globally across any content distribution channel and monitors the viewer's quality of experience on any platform, network, channel, or app at any given moment—uniquely out to the last mile. Broadcasters, multichannel video programming distributors (MVPDs) and other content owners may be provided with a valuable assessment of the health of their media operations, ranging from broad visibility to granular, in-depth reporting.

Subscriber Insights may provide insight required to understand the "Silent Sufferers" vs. speculation. A churn pattern analysis, risk detection, prediction and prevention analysis may be performed. These insights may lead to an organization's tech support and customer care being able to provide an informed and rapid response to subscriber errors and complaints. Additionally, a number of calls to a customer support center may be reduced by employing preventive actions. In this way, the silent sufferers may be met where they are and their problems may be acknowledged and solved without them first calling and complaining.

An infrastructure investment strategy may incorporate network analysis and optimization. Network modernization methods, for example, migration to a Software Defined Network (SDN) to support a dynamically changing environment and behavior based subscriber demands may improve network conditions and reduce latency, errors and the like. In an embodiment, Content Delivery Networks (CDNs), cache servers and SDN bandwidth may be dynamically managed. It is important to determine the biggest bang for the buck, i.e. the highest ROI.

New sources of data for Business Intelligence (BI) may be identified. In this way, ARPU may be grown by analyzing behavior, identifying changes, generating targeted offers, up selling and the like. In an embodiment, it may be desirable to optimize inventory of Live, Scheduled, Non-linear and on-demand content. Further, having an understanding of competitive and other external influencers may be helpful as it related to building a risk model. Other elements that may be incorporated into a model include a measurement of content performance for reuse and retirement. A closed loop service quality management may be employed to know, predict and proactively prevent.

Figure 16:
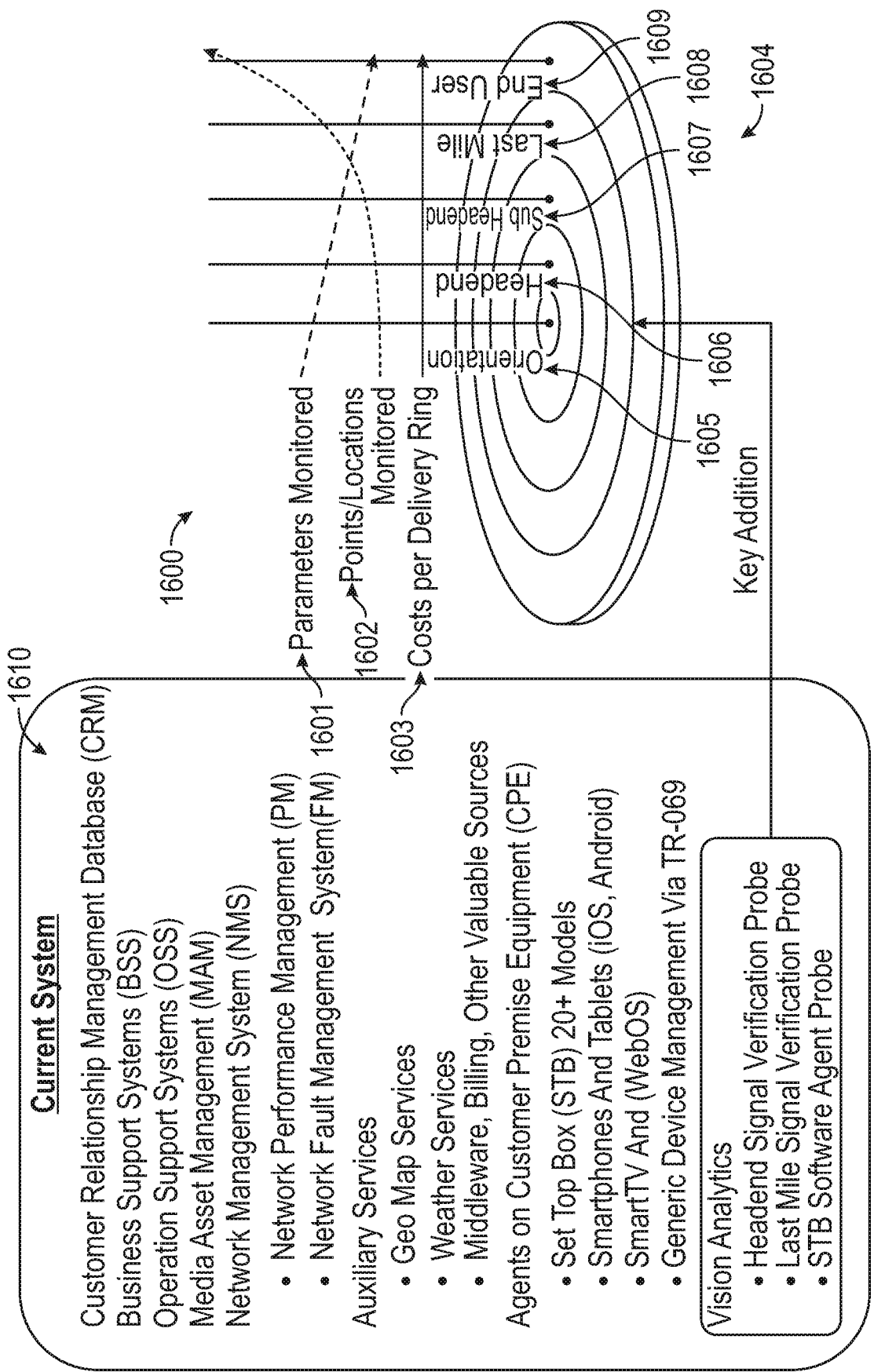
FIG. 16 is an illustration of parameters, locations and costs which may be monitored over a plurality of concentric delivery rings.

FIG. 16 is an illustration 1600 of parameters monitored 1601, points/locations 1602 and costs 1603 which may be monitored over a plurality of concentric delivery rings 1604. The concentric rings 1604 include orientation 1605, headend 1606, sub headend 1607, last mile 1608 and end user 1609 rings. Data from current systems 1610, including customer relationship management (CRM) systems, customer premise equipment (CPE), business support systems (BSS), operations support systems (OSS), mobile application management (MAM), network management systems (NMS), performance management (PM) systems, fault management (FM) systems may be monitored. Data collected may be data collected by end-user and last-mile probes. A practical approach to deploying and managing last mile and end user probes may be critical to the collection of useful data.

The concentric rings 1604 of FIG. 16 illustrate that the further away from the central office, the number of points/locations monitored 1602, including equipment and/or organizations involved, grows.

Figure 17:
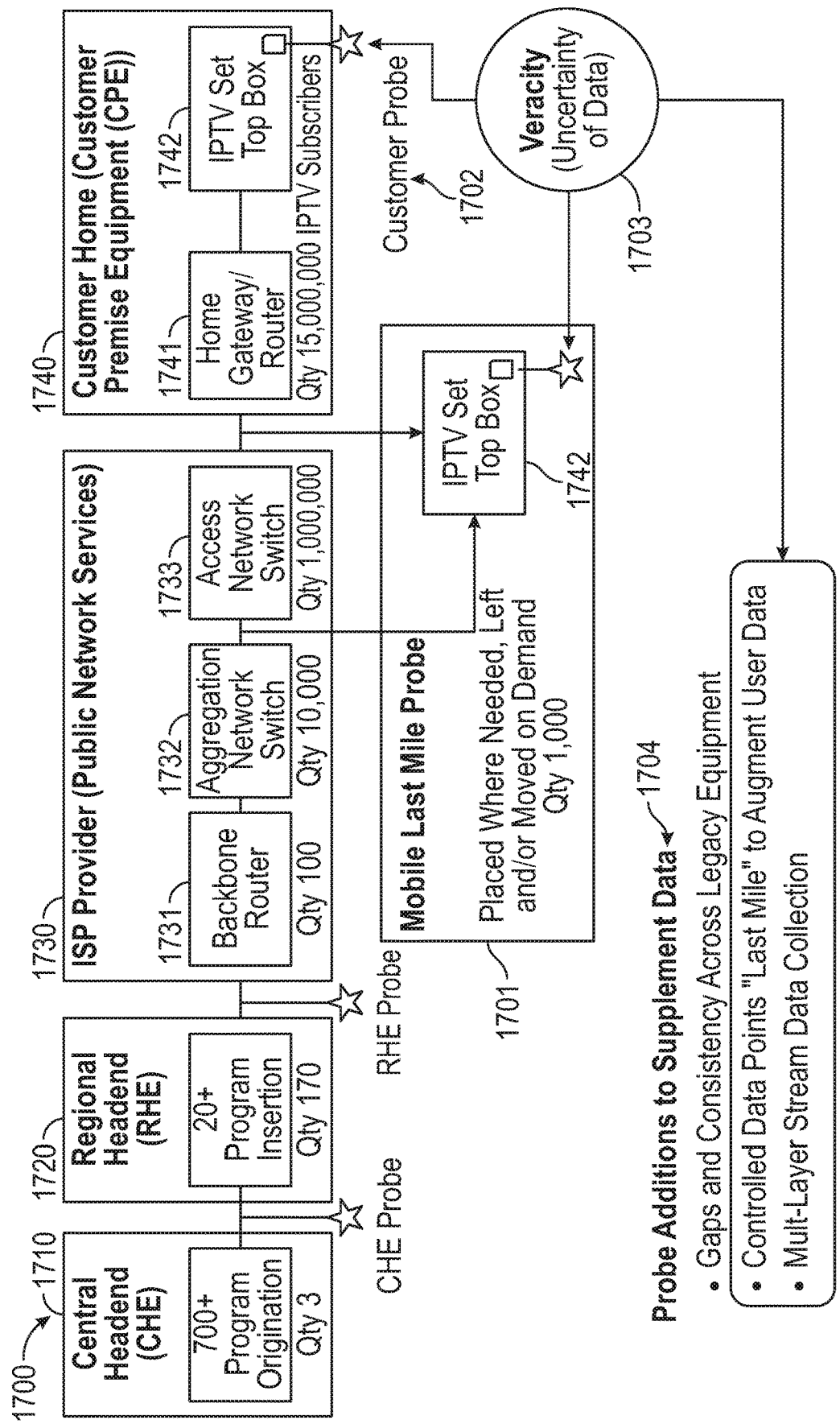
FIG. 17 is an illustration of a delivery path from a central headend, regional headend, internet service provider (ISP), through the customer home premise equipment.

FIG. 17 is an illustration of a delivery path 1700 from a central headend 1710, to a regional headend 1720, to an ISP (Public Network Services) 1730, to the customer home premise equipment 1740.

There are few central offices, for example central headends 1710, that are responsible for content creation. This portion may be thought of as components of major networks, for example, FOX, NBC, CBS, etc. The notion of three central headends 1710 is used as an example and other numbers may be equally applicable.

Media content from the central offices goes to regional offices, such as regional headends 1720. Each network may have offices in each state or group of states. Thus, there are significantly more regional headends 1720 than there are central headends 1710. A number 170 may be used as an example. A regional headend 1720 may receive media content from one or more central headends 1710 and modify the media content as is suited for regional needs. For example, a regional headend 1720 may update the transmission time based on local time zone, add region relevant information, select content that is most relevant to the region and the like.

The content is then provided to a distribution network, such as an ISP 1730. An ISP 1730 may be comprised of backbone routers, aggregation switches and access network switches. The distribution network may be thought of as a treelike structure where the backbone equipment are the roots, the aggregation servers are major branches and access servers are small branches at the ends of the major branches.

Using the tree analogy, it is easy to see that there is more equipment in the aggregation network than exists in the backbones. The number of access network equipment may also be sufficiently larger or more complex than aggregation network equipment. In examples, there may be 100 backbone routers 1731, 10,000 aggregation network switches 1732, and 1,000,000 access network switches 1733.

The content is then provided to customer home premise equipment 1740 which may comprise home gateway/routers 1741 and an IPTV set top boxes 1742. Each access network switch serves many end subscribers. As such, the number of home gateway routers is again larger than the number of access network switches. In examples, there may be 15,000,000 home gateway routers. In a single U.S. household there may be several TV sets, computers and mobile devices connected to the same home gateway router that play media content. Therefore, the number of the media players, i.e. the number of leaves on the tree, is even bigger.

A distribution network is usually well managed. Owners employ different kinds of Network Management Systems (NMS) to monitor the health of the equipment and links. This information can be retrieved using commonly known interfaces like the Simple Network Management Protocol (SNMP). However, home equipment, including IPTV set top boxes, mobile devices and computers are typically not monitored. There may be some veracity, i.e., uncertainty of data 1703. Thus, if a subscriber complains that he cannot view a show but the root cause of the problem is unknown until a technician visits the house, the problem may take days to be resolved. Depending on the uncertainty of data 1703, probe additions to supplement data 1704 may be determined and implemented.

Adding probes to the home equipment enables monitoring of the home portion of the distribution network. By collecting data from the probes of the system, it may be possible to determine precisely where a problem is occurring, for example, a cable is unplugged, set-top box (STB) power is turned off, excessive error rate between the access switch and the STB box, etc. Adding probes to the home equipment is a key enabling point for getting true reliable information about subscribers viewing experience, health of the house equipment, and condition of last mile link.

With probes added to headend offices, the loop may be closed. In this way, a full picture of the system may be visible. Thus, what was sent out from the headend offices and what was received by the end users may be completely visible to network operators, content creators and the like.

Last mile probes 1701 may be placed at the ISP 1730, for example between an aggregation network switch 1732 and an access network switch 1733. Further, last mile probe may be included at an IPTV set top box 1742 along with or in place of customer probe 1702. In embodiments, customer probes 1702 may be placed in or at the IPTV set top box 1742. Customer probes 1702, such as hardware or software based probes, may reside on a cellular phone, pad device or personal computer. Probes may provide supplemental data to fill gaps and provide consistency across legacy equipment. They may also provide controlled data points for the "last mile" to augment user data and multi-layer stream data collection.

Table 1 illustrates example Key Performance Indicators (KPIs). Table 2 illustrates example key quality indicators (KQIs). KPIs and KQIs may be utilized from GB923 "Wireless Service Measurements Solution Suite" Version 3.0, TMForum. Quality of Service (QoS) indicators may be of [ITU-T Rec.E.800]. Quality of Experience (QoE) indicators may be of [ITU-rec/T-REC-G.100]. Each one of these documents is incorporated by reference herein in its entirety.

TABLE 1

| Example KPIs | Definition |
| --- | --- |
| Service Availability Ratio | Period of time the service was available over the total time period |
| % Subscriber Sessions with Degradation | Number of sessions experiencing quality degradation over the total number of active service sessions |
| Service Recovery Time | Average time to recover the service after a fault |

TABLE 2

| Example KQIs | Definition |
| --- | --- |
| K-Headend ($\mathbb{K}_{HE}$) | Availability factor of operator equipment for media transmission |
| K-Network ($\mathbb{K}_{Net}$) | Availability factor of the service provider network with respect to the IPTV service |
| K-Subscriber ($\mathbb{K}_{Sub}$) | Availability factor of subscriber equipment for media reception |

KQIs and KPIs may be created, mixed and matched to conform to any number of perspectives. Depending on what information one is interested in, different subsets of raw data may be used to calculate KQIs and KPIs. For example, data may be used from all subscribers in a country. From this information, the system may determine overall availability factors $\mathbb{K}_{Sub}$, $K_{net}$, $\mathbb{K}_{HE}$) for the country.

In another example, data from each state of a country may be used separately. In this way, the system may calculate availability factors for each state and thus an identification of how each state performs may be made.

In another example, data from each county/city within a state may be relied on. In this way, the system may calculate availability factors for each county/city. This drill down allows for worst states and/or counties/cities to be identified and a direct effort and capital may be spent to improve the worst performers rather than equally spreading money between everybody including highly performing areas.

In an embodiment, a $\mathbb{K}_{Sub}$ calculation may be made using data from a group of selected subscribers, $K_{Net}$ using data from network equipment that delivers media to this group of selected subscribers, and $\mathbb{K}_{HE}$ from the headend equipment that transmits media streams to this group of selected subscribers. It then may be determined whether head-end equipment, network equipment, or subscriber equipment (STB and/or OTT player applications and last mile communication line) contributed most to subscriber dissatisfaction.

In an embodiment, a $\mathbb{K}_{Sub}$ KQI may be calculated using historical data from subscribers for those who cancelled the service and for those who stayed. In this way, the system can identify dissatisfactory and satisfactory KQI levels. A threshold may then be determined and an alarm may be raised when a current KQI level drops below the threshold.

In an embodiment, KQIs may be calculated using data from subscribers and networks that use cable vs. fiber optic connections. This calculation may show a difference in reliability and quality between these two technologies. It can lead to decision whether to perform a distribution network update.

In an embodiment, a $K_{Net}$ may be calculated for different servers on the network and a $\mathbb{K}_{Sub}$ may be calculated separately for a group of subscribers fed by these servers. The system may then compare quality and reliability of these servers.

In an embodiment, KQIs and KPIs may be calculated separately for each one of a plurality of media networks, such as Fox, and NBS. In this way, the system may determine which network suffered most or which was disadvantaged or treated in less favorable way by the distribution network or ISP.

In an embodiment, KQIs and KPIs may be calculated using historical data from subscribers who cancelled the service and who had or did not have access to a competitor ISP. This calculation may shed light on how availability of one or more competing ISPs may change a subscriber's tolerance of service quality. There are countless ways data can be calculated depending on a needed perspective.

Examples of service availability metrics may include technology, geography, subscription, KPIs, KQIs, and the like. A technology may refer to a xPON, FTTx, etc. Geography may relate to an access switch or segment. A subscription may encompass a subscription package or a subscription of an individual subscriber. A KPI may be an indicator or measure of a certain aspect of a unique service, resource or resource group. KPI may always refer to a certain type of resource. For example, KPIs tend to be ratios, factors, or percentages based on raw parameters, other KPIs and KQIs to describe a certain aspect of a resource.

A KQI may represent a measure of a certain aspect of the functioning of a product, its component (service) or service elements, and may be derived from a variety of sources including KPI and/or KQIs tending to be more derived from complex formulas based on raw parameters and other KPIs and KQIs describing a certain functionality of a service.

KQIs may refer to sets of complex analytical computations that may be modeled to indicate the service availability of the Headend ($\mathbb{K}_{HE}$), Network ($\mathbb{K}_{Net}$), and Subscriber ($\mathbb{K}_{Sub}$) domains. To simplify the understanding and use of the results, the KPIs and KQIs were broken down into three domains, per the topology diagram Headend, Network, Subscriber, and designed such that any number output that was lower than 95% required corrective action. Some examples are provided below.

Figure 18:
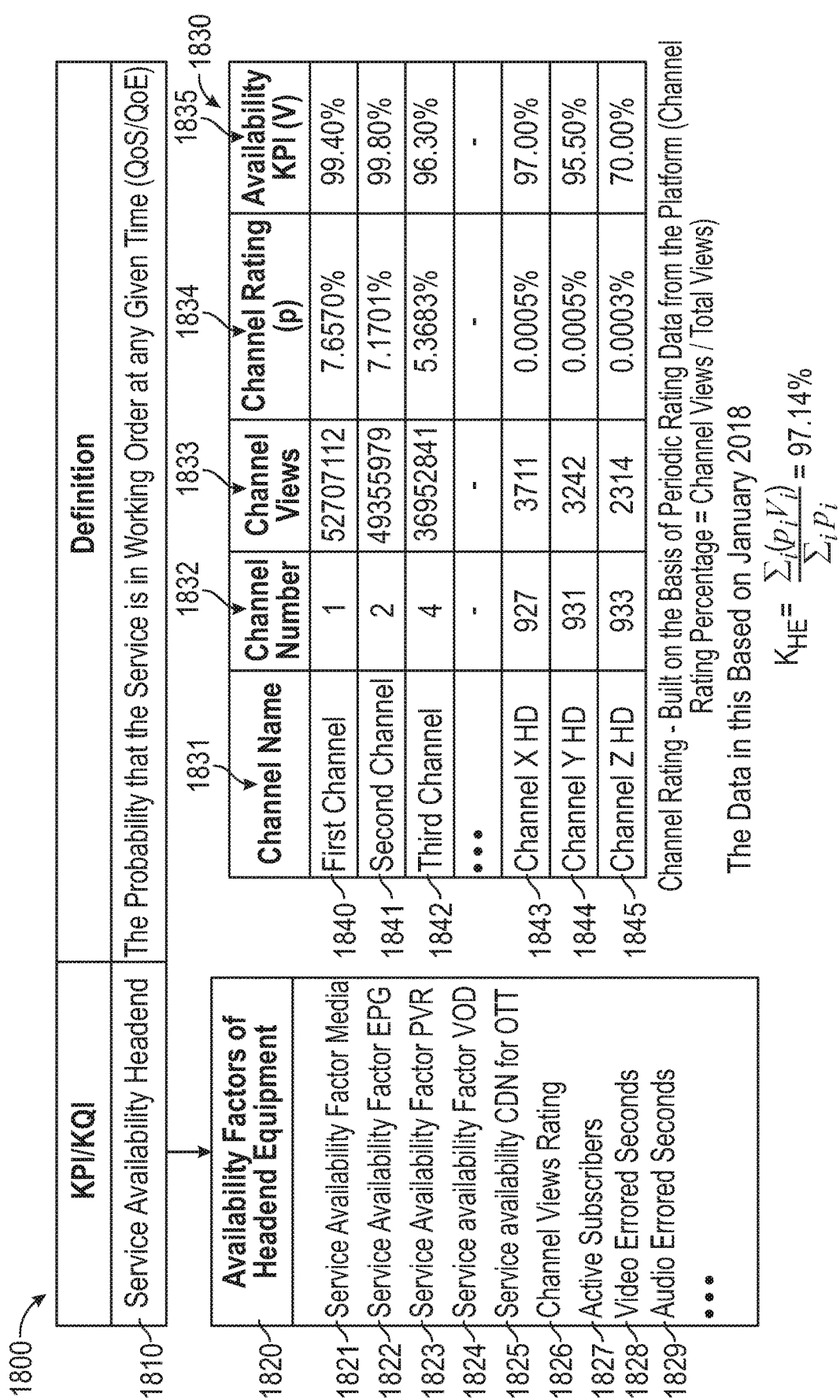
FIG. 18 includes an illustration and description of a headend service availability KQI.

FIG. 18 includes an illustration and description 1800 of a headend service availability KQI 1810. One KPI/KQI may focus on the service availability 1810 of the headend. Availability factors of the headend equipment 1820 may include a service availability factor corresponding to media 1821, a service availability factor corresponding to an EPG 1822, a service availability factor corresponding to PVR 1823, a service availability factor corresponding to VOD 1824, a service availability corresponding to CDN for OTT 1825, a channel view rating 1826, active subscribers 1827, video errored sections 1828, audio errored seconds 1829, etc. In an availability table 1830, an availability KPI 1835 is determined for each channel of a plurality of channels 1840-1845. Table 1830 organizes channels 1840-1845 by channel name 1831 and channel number 1832. The availability KPI 1835 may be based on channel views 1833 and channel rating 1834. Channel views 1833 may be equal to the number of seconds of viewing over the reporting period. Each individual service may be used in combination with active subscribers and a channel rating 1834 may be based only on the services they offer. This helps with calculating an overall "Impact Analysis" on a per channel basis. An availability factor of operator equipment for media transmission ($\mathbb{K}_{HE}$) may be calculated via Equation 1 using the values in the Availability Table 1830. In an embodiment, the analysis may be accurate up to the second.

$$\mathcal{K}_{HE} = \frac{\sum_i (p_i V_i)}{\sum_i p_i} \quad \text{Equation 1}$$

In Equation 1, p is an importance weighting of the channel or service and V is the service availability of the channel or service.

Figure 19:
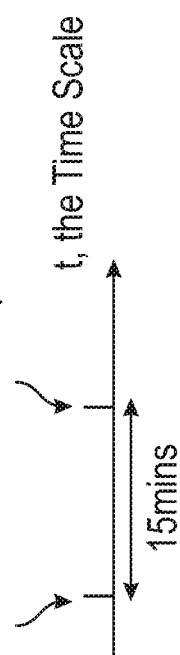
FIG. 19 includes an illustration and description of a network service availability KQI.

FIG. 19 includes an illustration and description 1900 of a network service availability KQI. The network service availability KQI 1910 focuses on the probability that the service is in working order at any given time. Since an IPTV service has many distributed components, the service availability network KQI 1910 may be generated from an equipment and redundancy scheme availability traced out to each individual subscriber. Availability factors of the service provider 1920 may include equipment accessibility 1921, redundancy availability 1922, active subscribers 1923, total access equipment with errors 1924, recovery time 1925, additional data collected from FM system 1926, additional data collected from PM system 1927, additional data collected from NMS system 1928, etc. The availability factor of the service provider network with respect to the IPTV service ($K_{Net}$) may be calculated via Equation 2.

$$\mathcal{K}_{Net} = \frac{A_t - \frac{1}{T_{Rt}} \sum_{j=0}^{N} \left( A_j \sum_{i=1}^{M} T_{ji} \right)}{A_t} \quad \text{Equation 2}$$

In Equation 2, $T_{Rt}$ is the total report time, $A_t$ represents the total subscribers of the service; $A_j$ represents the total subscribers for the service on the j-th access equipment; N represents the total access equipment with error seconds for the period; M represents a number of error intervals for each unit of equipment and $T_{ji}$ represents each i-th error interval on the j-th access equipment.

A trace of the signal path of the equipment may be made out to the access switches. This may be correlated with any PM/FM/or NMS fault or performance abnormalities and may be weighted based on active subscribers. If there is no one on the service, then not as big an issue. A side calculation may be performed as an overlay to impact analysis in the recovery time so they can determine the subscriber impacts based on duration of an outage. Also, in an embodiment, a dollar figure may be calculated as to any outage instantly.

Figure 20:
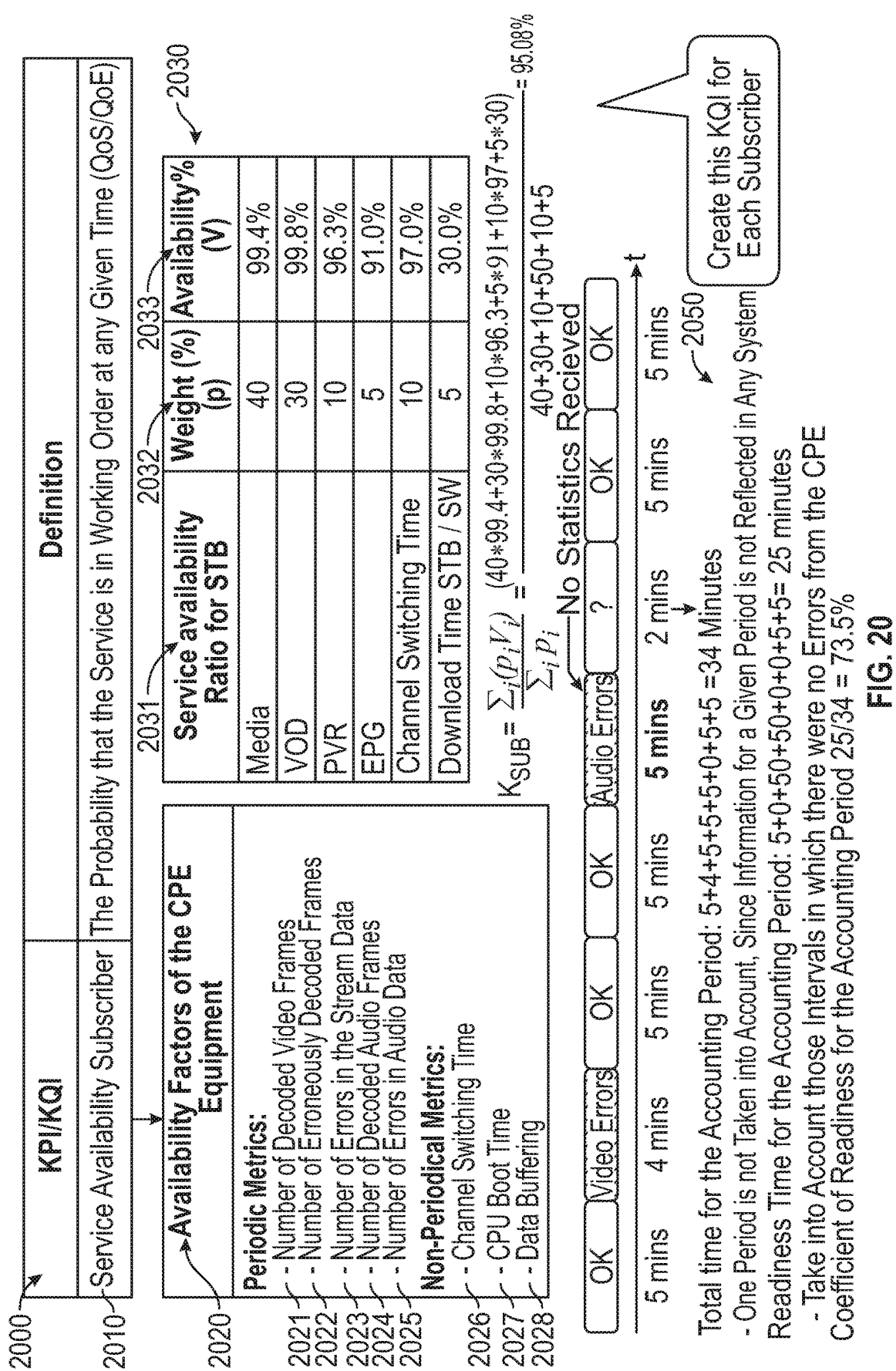
FIG. 20 includes an illustration and description of a subscriber service availability KQI.

FIG. 20 includes an illustration and description 2000 of a subscriber service availability KQI 2010. The subscriber service availability KQI 2010 focuses on the probability that the service is in working order at any given time. The subscriber focused KQI 2010 collects data from their specific elemental services and uses weightings to calculate a service availability for each individual subscriber. Availability factors of the CPE equipment 2020 may include periodic metrics such as number of decoded video frames 2021, number of erroneously decoded frames 2022, number of errors in the stream data 2023, number of decoded audio frames 2024, and number of errors in the audio data 2025, and non-periodical metrics, such as channel switching time 2026, CPU boot time 2027, and data buffering 2028. In the service availability table 2030, a weight 2032 and a service availability 2033 is determined for each elemental service 2031 (for example, media, VOD, PVR, EPG, channel switching time, download time STB/SW). Next, the service availability for an individual subscriber ($K_{Sub}$) is calculated via Equation 3 using values in the Service Availability Table 2030.

$$\mathcal{K}_{Sub} = \frac{\sum_i (p_i V_i)}{\sum_i p_i} \quad \text{Equation 3}$$

In Equation 3, p represents an importance weighting of a service and V represents an availability of the service.

A method 2050 for aggregating audio and video errors is illustrated. First a total time for an accounting period is calculated by adding the periods. If information for a given period is not reflected in any system, the period is not taken into account. Next, a readiness time for the accounting period is calculated. In the readiness time, periods for which there were no errors from the CPE are taken into account. The readiness time is divided by the total time to calculate the coefficient of readiness for the accounting period.

Combining all three KQIs ($K_{HE}$, $K_{Net}$, $K_{Sub}$) provides a view from a country overview with a drill down into region, to city to end subscriber. An automated dialing system may call a person who suffers an outage, but did not preemptively call to complain. This information may also be used as training data for the AI for silent suffer prediction and prevention. In an embodiment, the phone calls may target individual subscribers, subscribers within a city, region or country.

Embodiments disclosed herein may include the data collection and mining with controlled "Last Mile" probes and end-user "IoT" probes. A big data architecture may be employed to process the new and legacy data in real-time. A workflow or sequence may be created to process the data. Last mile equipment may include cellular phones, tablets and the like. Probes may be software or hardware based devices and may be resident in applications or operating systems on the equipment.

In embodiments, calculations related to the KPIs and KQIs and may employ algorithms to create predictive and prescriptive analytics.

For methods and inputs disclosed herein, machine learning may be used in churn and support request prediction. Methods include gradient boosting machines as predictive models. Gradient boosting machines are a way of making compositions of decision trees to maximize the prediction accuracy. Some implementations may include Catboost (from Yandex) and GradientBoostingClassifier (from Sklearn). Other implementations may be used as well.

Gradient boosting is a machine learning technique for regression and classification problems, which produces a prediction model in the form of an ensemble of weak prediction models, typically decision trees. Although Gradient boosting is a well-known algorithm selecting sets of data to use as input for prediction is a unique challenge for this application. Another unique challenge is preparation of collected input data for entering into the ML model to achieve optimal performance.

In embodiments, data may be collected weekly for a period, for example, every week for a 12 week period. In an example, 8 parameters selected from Table 3 are selected for collection. Thus, 12*8=96 values are collected over the 12 week period. One data preparation goal is to convert 2-D array of data with one axis representing time (weeks) into 1-D vector where each parameter characterizes the entire 12 weeks period. At the same time the vector should preserve notion of changes and trends each original parameter exhibited for 12 weeks. This step helps the ML model to establish associations between the parameters during training and prediction. As the result the ML model becomes simpler, speedier, and more accurate.

Data preparation may comprise the calculation of minimum, maximum, average, and standard deviation for each of the 8 parameters over the example 12 week period. These 32 parameters are included in the ML input data set. Next, a linear regression y=A*x+B may be created for a Total TV watching time and a number of times a user switched channels. This linear regression may be useful to identify trends since a decreasing TV watching time and increasing channel switching time may suggest the user is losing interest. The A and B regression coefficients for these parameters make additional 4 parameters included in the ML input data set.

A timestamp of the first and last data collected for a 12 week period in the form of "seconds ago from present time" are added to the ML input data set. It may be important to use time relative to present time instead of absolute time for timestamps. Otherwise data will be linked to particular time and the ML model will not be able to compare data for different 12 weeks periods.

Finally metadata from the user account—age of the user account, payment plan (residential, business, hotel, dorm, bundled with other services etc.), location (big city, town, village etc.)—are also added to the ML input data. The ML model receives the prepared data and calculates probability that the user will soon churn.

Selection of a threshold to label the user as "high risk" directly impacts precision and recall metrics of the ML model. A higher threshold reduces the number of users highlighted as "high risk." It also improves precision since highlighted users are more likely to actually cancel the service. But a higher threshold decreases the recall metric as more people who cancel the service later are not included in the "high risk" group. The threshold should be set according to provider strategies and goals. If the strategy is for customer service to call each "high risk" subscriber, interview the subscriber and take preventive measures to keep the subscriber, than the threshold could be set higher to keep the size of the "high risk" subscriber pool manageable for customer service. If the strategy is to monitor for early signs of increasing customer dissatisfaction with the service and take actions to generally improve service quality without contacting customers, then the threshold could be set lower.

For a given user, churn prediction may be calculated periodically (for example every 4 weeks) using a new set of input data.

Data from many (thousands) of users, both which churned and stayed, covering different locations, payment plans, and account age should be used for the ML model training. The more data which is used for training purposes, the more accurate prediction will be.

Neural networks may be employed to handle time components. Some neural network types may include Recurrent Neural Networks (RNNs) and Convolution Neural Networks (CCNs). An implementation may be performed using tensorflow/keras.

Several sources of input, for example, telemetry data, subscriber metadata, and content metadata may be combined. Content metadata may include, but is not limited to, Channel names, Program name, Program genre, Channel rating, Program rating, VOD title names, VOD title genre, and VOD title rating. Subscriber metadata may include, but is not limited to Profile creation date, Location and sub_location, Last authorization date, Subscription plan (price, included channels, options, etc.), history of additional purchases (VOD, upgrades, etc.), Presence of Internet service in addition to TV service, Account type (residential or business), and Network type (FTTB, DSL, etc.) Table 3 provides example telemetry data.

TABLE 3

| Telemetry data parameter | Definition |
| --- | --- |
| Uptime | Time since STB was powered on. |
| Link faults | Number of TS stream Continuity Count errors during collection interval. A link fault makes TV programs unavailable. |
| Time interval | Time interval used for statistics collection. |
| Power state | STB current state:<br>0 - Sleep<br>1 - Standby<br>2 - Active |
| Stream type | Type of TS stream Unicast/Multicast. |
| UDP packets received | Number of UDP packets received during the collection interval. |
| Decoded video frames | Number of decoded video frames during the collection interval. |
| Video decoder errors | Number of video frames decoded with errors during the collection interval. |
| Data errors | Number of data errors during the collection interval. |
| Decoded audio frames | Number of decoded audio frames during the collection interval. |
| Audio decoder errors | Number of errors in audio data during the collection interval. |
| Session duration | Duration of current session - Time elapsed since subscriber started viewing current video content (TV channel, downloaded Movie, etc.). |
| TV is On period | Time since TV set was powered on. |
| Power state period | Time since last power state change. |
| User idle period | Time since subscriber last time pressed a button on STB Remote. |
| CPU temperature | STB CPU temperature. |
| Message counter | Statistics messages sequence number. It determines lost messages and characterizes the quality of messaging channel. |
| Media overflow | Number of events when media data arrived more than 1 second earlier than expected during the collection interval. Usually it does not impact viewing experience, but it is early indicator of irregularities in the distribution network. |
| Media underflow | Number of events when media data arrived more than 1 second later than expected during the collection interval. Usually it does not impact viewing experience, but it is early indicator of irregularities in the distribution network. |
| Delay factor | Value equal to maximum deviation of media data arrival time from expected arrival time during the collection interval. Delay Factor characterizes minimum required buffer size to smoothen media data arrival time jitter. |
| STB probe version | STB Vision agent version. Vision agent is probe embedded in STB software to collect telemetry data. |
| TS scrambled | TS stream is scrambled or encrypted. |
| Buffer underruns | Number of cases when video play was temporary paused due to lack of media data in media player receiving buffer during the collection interval.<br>It happens when there are problems delivering media data in distribution network. |
| Buffer overruns | Number of cases when media data were discarded due to media player receiving buffer overflow during the collection |

TABLE 3-continued

| Telemetry data parameter | Definition |
|---|---|
| | interval. It happens when a burst of media data bigger than the buffer can handle arrives. |
| Average CPU utilization | Average STB CPU utilization (for each CPU core) during the collection interval. |
| Maximum CPU utilization | Maximum STB CPU utilization during the collection interval. |
| CPU cores | Number of cores STB CPU has. |
| IP ToS | Network IP ToS (Type of Service). Contains IP packets DSCP & ECN values corresponding to slowest service during the collection interval. |
| Clock Continuity errors | Number of packets with discontinuity of presentation or decoding timestamps (PTS or DTS) in TS stream as specified in the ETSI TR101 290 during the collection interval. That indicates packet loss in distribution or irregularities in transmission Head End. |
| Continuity Count errors | Continuity Count errors as specified in ETSI TR 101 290 during the collection interval. It is an indicator of incorrect packet order. |
| PID errors | PID error as specified in ETSI TR 101 290 during the collection interval. Referred Program ID (PID) does not occur for a specified period. |
| Rx physical errors | Number of errors (e.g., packet cyclic redundancy check (CRC) errors, frame alignment errors, etc.) at interface (Ethernet or WiFi) physical layer. |
| Service account | Service Account number. |
| Current bitrate | Current TS stream bitrate while using adaptive streaming (HLS). |
| CPU clock | STB CPU clock. |
| Time zone | Subscriber Time zone. |
| Power change cause | Cause of powerState change: user action, timeout. |
| HDMI status | HDMI cable status: connected, disconnected, not used (other than HDMI connection). |
| UI element ID | Identification of User Interface (UI) element, which was used to start current viewing session. |
| Buffering events | Number of times buffering has started during the collection interval. |
| Buffering seconds | Duration of "video is buffering" state during the collection interval. |
| Paused seconds | Duration of "video paused" state during the collection interval. |
| Media bitrate | Average media stream bitrate during the collection interval. |
| Interface bitrate | Average bitrate of received data as seen at physical interface during the collection interval. |
| Interface errors | Number of errors at network layer during the collection interval. |
| TS SyncLoss errors | Number of TS Synchronization errors during the collection interval. |
| Rx overflow | Number of received IP packets lost due to physical interface buffer overflow. |
| Network type | Network type: Ethernet, WiFi. |
| Ethernet interface mode | Ethernet interface mode: 10 Mbps Half duplex, 10 Mbps Full duplex, 100 Mbps Half duplex, 100 Mbps Full duplex, 1 Gbps Full duplex. |
| Content type | Currently viewed content type: Live TV, Video on Demand (VoD), Electronic Program Guide (EPG), Personal Video Recorder (PVR), Over the Top (OTT) video like YouTube. |
| Channel ID | ID of currently watched channel (for Live TV). |
| Media ID | ID of currently watched video (for VoD and PVR). |
| Switching time | Time it takes to switch STB to new channel. |
| Player URL | URL of currently played OTT video. |
| Load time | Time it takes STB to load VoD, PVR, or OTT content. |
| Total TV watching time | Total TV watching time during a week measured in 5 minutes intervals. |
| Channel switch frequency | Number of times user switched channels during a week. |

KPI and KQI performance values alone may not be enough to predict subscriber behavior. For instance, some subscribers may call the support center or leave the service while other subscribers with the same KQI do nothing and maintain their service. Subscribers should be classified by risk factor and subscribers in the high-risk group may be addressed first followed by lower-risk subscriber groups. Geolocation, for example, subscribers in a building and the presence of competitors may be considered as factors. Other subscriber behavior factors including history of complaints, purchases, viewing habits may also be considered.

The use of limited support resources should be optimized. For example, if low alert thresholds are configured, there may be more service tickets created than an operator can process. With high thresholds, real problems may not be addressed. Thus, again there is a need to address subscribers in the high-risk group(s) first.

Figure 21:
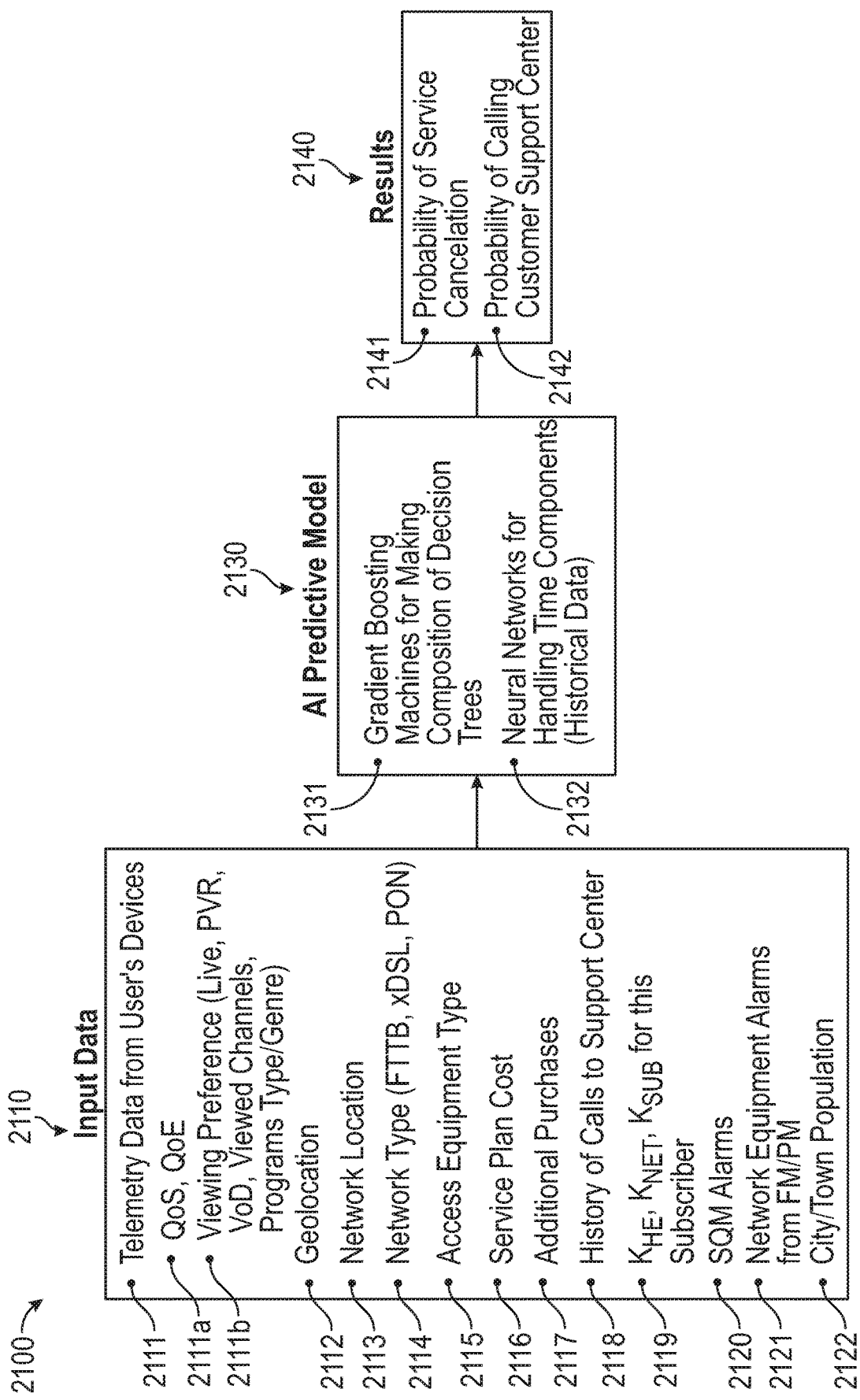
FIG. 21 illustrates an AI predictive model approach using input data to generate results.

FIG. 21 illustrates an AI predictive model approach 2100 using input data 2110 to generate results. Input data 2110 may include telemetry data 2111 from user devices including QoS and QoE data 2111a; viewing preferences 2111b, for example, live, PVR, VoD, viewed channels, program type/genre; geolocation data 2112; network location 2113; network type 2114, for example fiber to the building (FTTB), digital subscriber loop (xDSL), passive optical network (PON); access equipment type 2115; service plan cost 2116; additional purchases 2117; history of calls to the support center 2118; $K_{HE}$, $K_{NET}$ and $K_{SUB}$ for this subscriber 2119; service quality monitoring (SQM) system alarms 2120; network equipment alarms from FM/PM 2121; and city or town population 2122. Other input data may be included.

Once the telemetry data is collected, the data may be processed using an AI predictive model 2130. In one embodiment, the AI predictive model 2130 may use a gradient boosting machines 2131 method for making a composition of decision trees. In another embodiment, neural networks 2132 may be used for handling time components. Results 2140 may indicate a probability of service cancellation 2141 and a probability of a particular customer calling the support center 2142.

Subscribers may be ranked on their probability of cancelling service 2141 or a probability of calling the support center 2142. Subscribers with highest rank may be reached out to by telephone or email programmatically or via phone operators or help support. Other offers may be provided to the subscribers via email, text message or may be made available on the users set top box and/or OTT player application. Other electronic methods may be employed as well.

Figure 22:
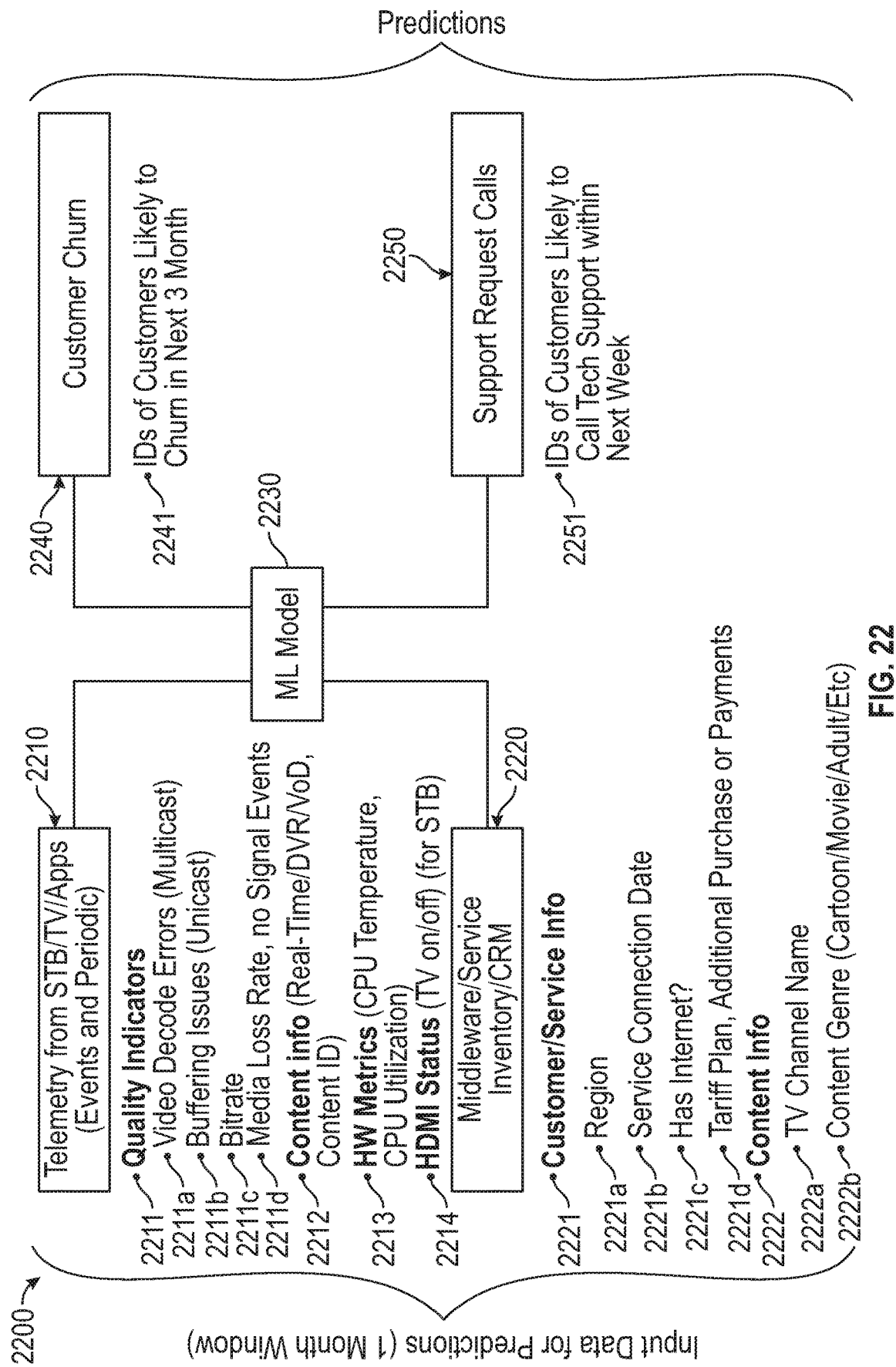
FIG. 22 further illustrates a similar concept to FIG. 21.

FIG. 22 further illustrates a similar concept 2200 to FIG. 21. On the left hand side, telemetry from STB, TV, and/or OTT Player apps 2210, including events and other periodic errors, etc. is collected. Telemetry may include quality indicators 2211 including video decoder errors 2211a when using multicast service, buffering issues 2211b when using unicast service, bitrate 2211c and media loss rate 2211d; content info 2212 including real-time/DVR/VoD, content ID; hardware metrics 2213 including CPU temperature and CPU utilization; and HDMI status 2214 indicating whether the TV is on or off for the set top box.

Other input data for predictions may come from middleware, service inventory and CRM 2220. Customer service info 2221 may relate to region 2221a, service connection data 2221b, whether the subscriber has internet 2221c, tariff plan and additional purchases or payments 2221d. Content info 2222 may also be considered, for example TV channel name 2222a and content genre 2222b, for example, cartoon, movie, adult or the like.

The input data may be input to a machine learning (ML) model 2230 and the results may include predictions on customer churn 2240 and support call requests 2250. Specifically, identifiers of customers likely to churn in 2241, for example, the next three months, may be identified along with a respective likelihood. In an embodiment, identifiers of customers likely to churn in the next 3 months may be identified. In other embodiments, other time periods may be predicted as well, for example, 1 month, 2 month, 6 month periods or the like. The same may be true for identifiers of customers likely to call tech support 2251 within the next X number of days or within the next week.

One type of machine learning model is known as Gradient Boosting Machines. This is a well-known and popular machine learning algorithm, which creates decision trees. The https://machinelearningmastery.com/gentle-introduction-gradient-boosting-algorithm-machine-learning/ and http://uc-r.github.io/gbm_regression are good sources of information on Gradient Boosting Machines.

Gradient Boosting is a machine learning technique for regression and classification problems, which produces a prediction model in the form of an ensemble of weak prediction models, typically decision trees. The idea is to use the weak learning method several times to get a succession of hypotheses, each one refocused on the examples that the previous ones found difficult and misclassified. Weak learning method is a method, which predicts results just slightly better than random choice.

Using Gradient Boosting, a prediction of whether a subscriber will leave or stay may be an output made available as a result file. A first model may be created using a set of training data. Then, all cases that are properly classified by the first model are removed from the data set and the remaining data may be used to create another learning method which may also be weak. The first and the second methods are combined with some weights. Then, all cases that are not properly classified using the combination of a first and second method are used to create third learning method. This iterative process of improving classification (boosting) is repeated many times, in some embodiments, upwards of 100 or more times. Finally the model, which combines all these weak learners with some weights have much stronger prediction capabilities than individual weak learning methods.

Software packages such as GradientBoostingClassifier from Sklearn and Catboost from Yandex may be used as an implementation of the Gardient Boosting Machine.

A prediction model may be illustrated using Precision and Recall metrics. These are common metrics used to characterize prediction quality of a model. The prediction precision is a ratio of true positive cases among all cases classified as positive by the model. In an embodiment, this may be a ratio of subscribers, who were predicted by the model and actually cancelled the service, to all subscribers predicted by the model as "At Risk" of cancelling.

Recall is ratio of true positive cases predicted by the model to total number of positive cases in the data set both predicted and not predicted (missed). In our system it is ratio of subscribers predicted by the model as "At Risk" and who actually cancelled the service to all subscribers (predicted and not) who cancelled the service.

Neural networks are a set of algorithms, modeled loosely after the human brain, that are designed to recognize patterns. Neural networks are used successfully to recognize visual images, speeches, data classification, etc. Neural networks may be self-organized, where each neuron performs a simple function. But links between them (the way they pass information to each other) are determined by an algorithm based on input of training data. Neural networks potentially may have better prediction capabilities at the expense of more difficult model tuning and adaptation. More information on neural networks and deep learning may be found at https://skymind.ai/wiki/neural-network, which is incorporated by reference herein in entirety. In one embodiment, the TensorFlow open source platform may be used as a Neural network machine learning algorithm.

Figure 23:
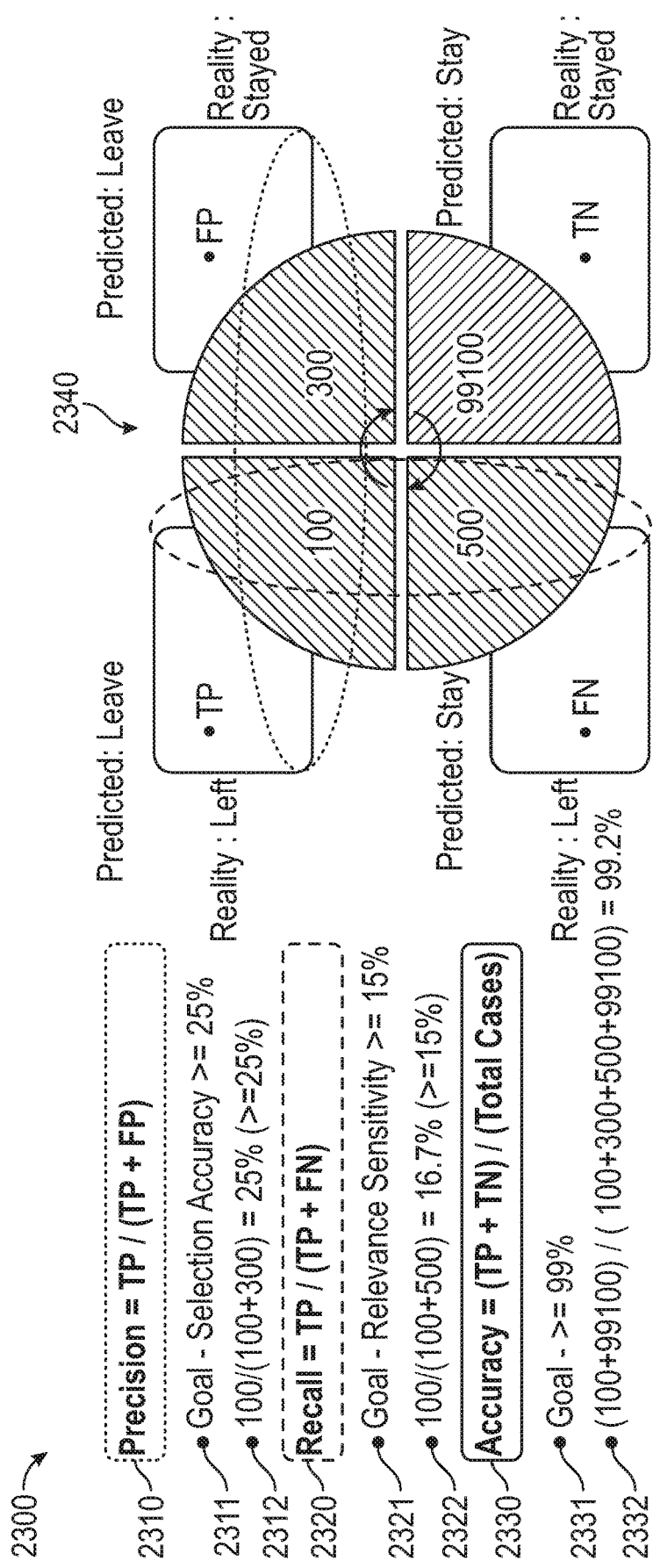
FIG. 23 is a diagram which provides information about the subscriber data set and prediction results.

FIG. 23 is a diagram 2300 which provides information about the subscriber data set and prediction results. From a high level view, using either one of or both of a Gradient Boosting machine algorithm and/or Neural Networks may provide the same or similar results. A true positive (TP) 2301 is a case where the prediction was that the customer will leave and in reality the customer left. A false positive (FP) 2302 is a case where the prediction was that the customer will leave and in reality the customer stayed. A true negative (TN) 2303 is a case where the prediction was that the customer will stay and in reality the customer stayed. A false negative (FN) 2304 is a case where the prediction was the customer will stay and in reality the customer left. Precision 2310 is calculated using Equation 4.

$$\text{Precision} = \frac{TP}{(TP+FP)} \quad \text{Equation 4}$$

Recall 2320 is calculated using Equation 5.

$$\text{Recall} = \frac{TP}{(TP+FN)} \quad \text{Equation 5}$$

Accuracy 2330 is calculated using Equation 6.

$$\text{Accuracy} = \frac{(TP+TN)}{\text{Total Cases}} \quad \text{Equation 6}$$

For precision 2310, the goal 2311 is to achieve a selection accuracy greater than or equal to 25%. In an embodiment 2312, if 100 TPs are determined out of 100+300 (400) TPs and FPs, then the selection accuracy is calculated at 25%.

For recall 2320, a goal 2321 is to achieve relevance sensitivity greater than or equal to 15%. In an example 2322, if 100 TPs are determined out of 100 TPs+500 FPs (600 total), then 16.7% of selections are relevant and thus the goal 2321 is satisfied. In determining accuracy 2330, a goal 2331 is to maintain accuracy greater than or equal to 99%. In an example 2332, (100 TPs+99100 TNs)/100+300+500+99100 total cases, an accuracy reality is achieved at 99.2%. On the right hand side of FIG. 23, a prediction chart 2340 shows a numerical breakdown of the TPs, FPs, FNs and TNs used in examples 2312, 2322 and 2332.

To validate the proposed method, an example of the user churn prediction system using the ML model was built. Data from 320,000 users was used for training. Then, the system was used for predicting churn for several months. The system showed the following performance: with a threshold of 0.5, precision was 58% and recall was 3%; with a threshold of 0.16 precision was 26% and recall was 22%. For reference, the actual churn rate during the validation period was 7% of all subscriber base. Thus, the proposed prediction method is effective on highlighting "high risk" subscribers and narrowing down customer support effort to keeping customers.

Figure 24:
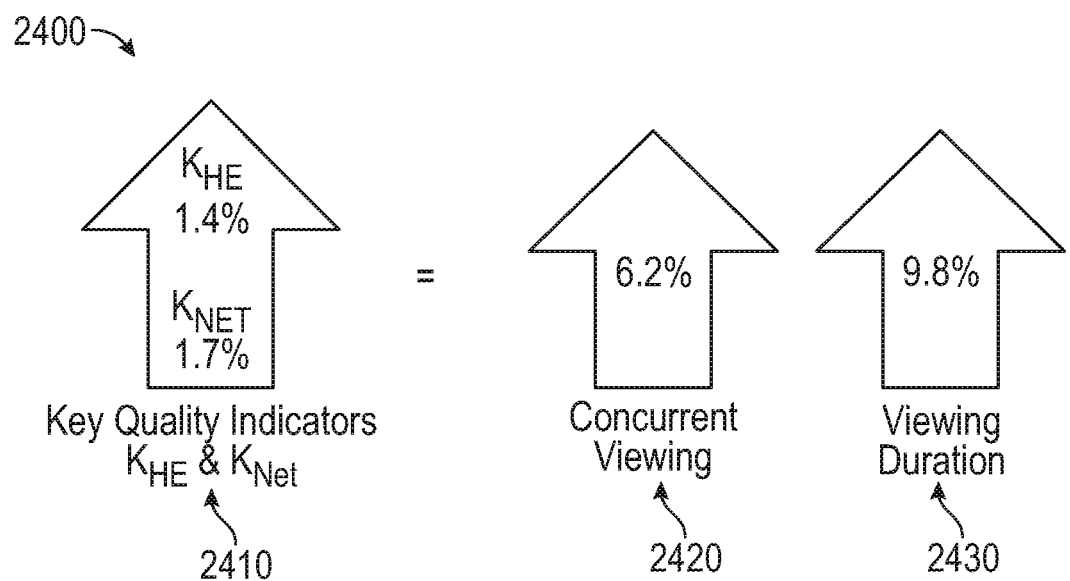
FIG. 24 is a diagram which illustrates the potential viewing impact of quality improvements.

FIG. 24 is a diagram 2400 which illustrates the potential viewing impact of quality improvements. If $K_{HE}$ and $K_{NET}$ KQIs 2410 are improved by 1.4% and 1.7% respectfully, with the help of corrective actions, a number of concurrent active-subscribers should also be expected to increase. The same may be true with viewing duration. By improving service quality, more concurrent viewers and longer average viewing times are to be expected. In some test cases, concurrent viewing 2420 was increased by 6.2% and viewing duration 2430 was increased by 9.8%, i.e. several folds more than the 1.4% and 1.7% improvement to the $K_{HE}$ and $K_{NET}$ KQIs.

A reduction in support calls is also to be expected with quality improvements. For example, the system may generate $K_{Sub}$ related predictive end-customer tickets per macro-region/per day for the second line support team to investigate. These end-customer tickets may relate to a prediction of a critical fault occurring within the next three to five days. The tickets allow for the issues to be addressed and may ultimately prevent the critical fault from happening. The system may generate, for example, an average of three to five predictive group tickets per macro-region/per day, for the second line support team to investigate for network nodes which affects four or more end-users.

Figure 25:
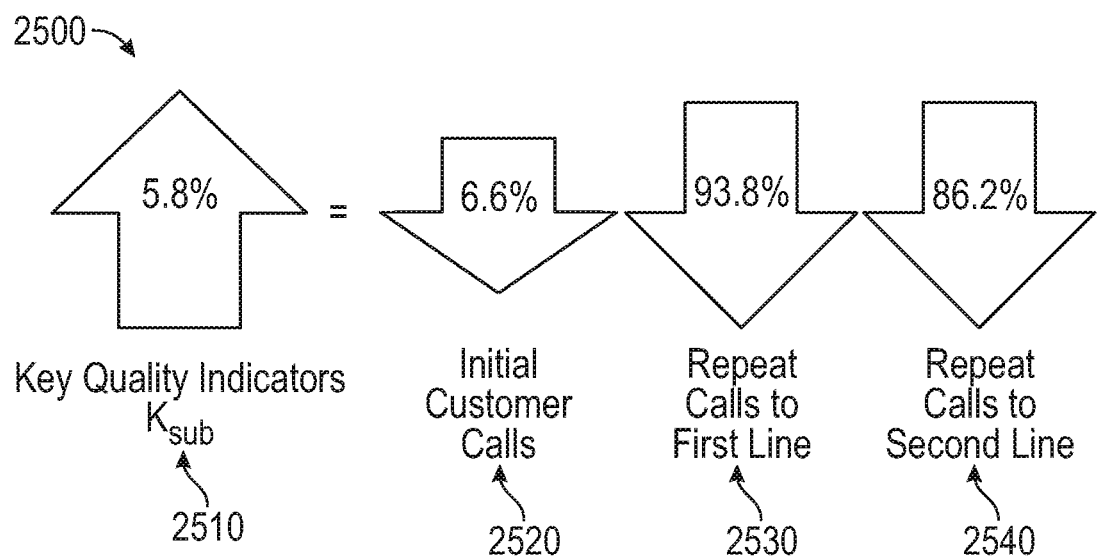
FIG. 25 illustrates complaint call impact of quality improvements.

FIG. 25 is a diagram 2500 which illustrates complaint call impact of quality improvements. If $K_{SUB}$ KQI 2510 is improved by 5.8%, with the help of corrective actions, the number of customer calls should decrease. A first-line support team taking initial customer calls 2520 may see a small decrease in the amount of the incoming calls from customers after deployment of the system. In some test cases, initial customer calls 2520 to the first-line support team decreased by 6.6%. However, a large decrease may be expected in the amount of repetitive calls from customers about the problems detected and initiated by the system. Thus, a second-line support team may see a large decrease in the amount of the repetitive calls from customers about the problems detected and initiated by the system. In some test cases, repeat calls to the first-line support team 2530 decreased by 93.8% and repeat calls to a second-line support team 2540 decreased by 86.2%. The benefits of achieving a much faster root cause will help reduce calls to the support team(s).

Based on system monitoring results, subscribers may be accumulated, prioritized and added to a churn prevention list. A list may be maintained, daily, weekly, monthly or the like. Subscribers on the list may be automatically called and any issues may be individually addressed to prevent churn.

In another embodiment, an analysis of individual subscriber preferences, active periods, and technical problems may be made. This analysis may be used by service agents who have an ability to share with subscribers their experience data. This demonstrates that the service provider is aware of, and is interested in, improving the consumer experience. Having this personalized knowledge before a call may be more successful than generic questionnaires or robotic calls with which no prior analysis was made.

In embodiments, subscriber churn may not be defined by an official cancellation of service. There is often a few months lag between when a subscriber stops using the service and when the official cancellation of a account occurs. This may be due to legal regulations in case the account is closed by a service provider for absence of payment, or due to some unpredictable factors on the customer side.

Predicting that a customer will officially churn after 3-6 months of inactivity would not provide useful information. Thus, embodiments herein make predictions for currently active customers who are expected to become not active users sooner than later. In an embodiment, a customer may be labeled as "churned" if the customer continues using a service for less than 2 months after a prediction point and then there is an inactivity period for at least 2 months and no activity since then. Other inactivity time periods may be chosen without derivation In an embodiment, a prediction algorithm comprises following steps: collecting data about a user activity and telemetry from his/her STB; preparing collected data for inputting into to the ML model; and running the ML model to calculate probability of the user to churn; comparing calculated probability with a threshold. If the calculated probability exceeds the threshold then the user may be marked as "high risk."

Figure 26:
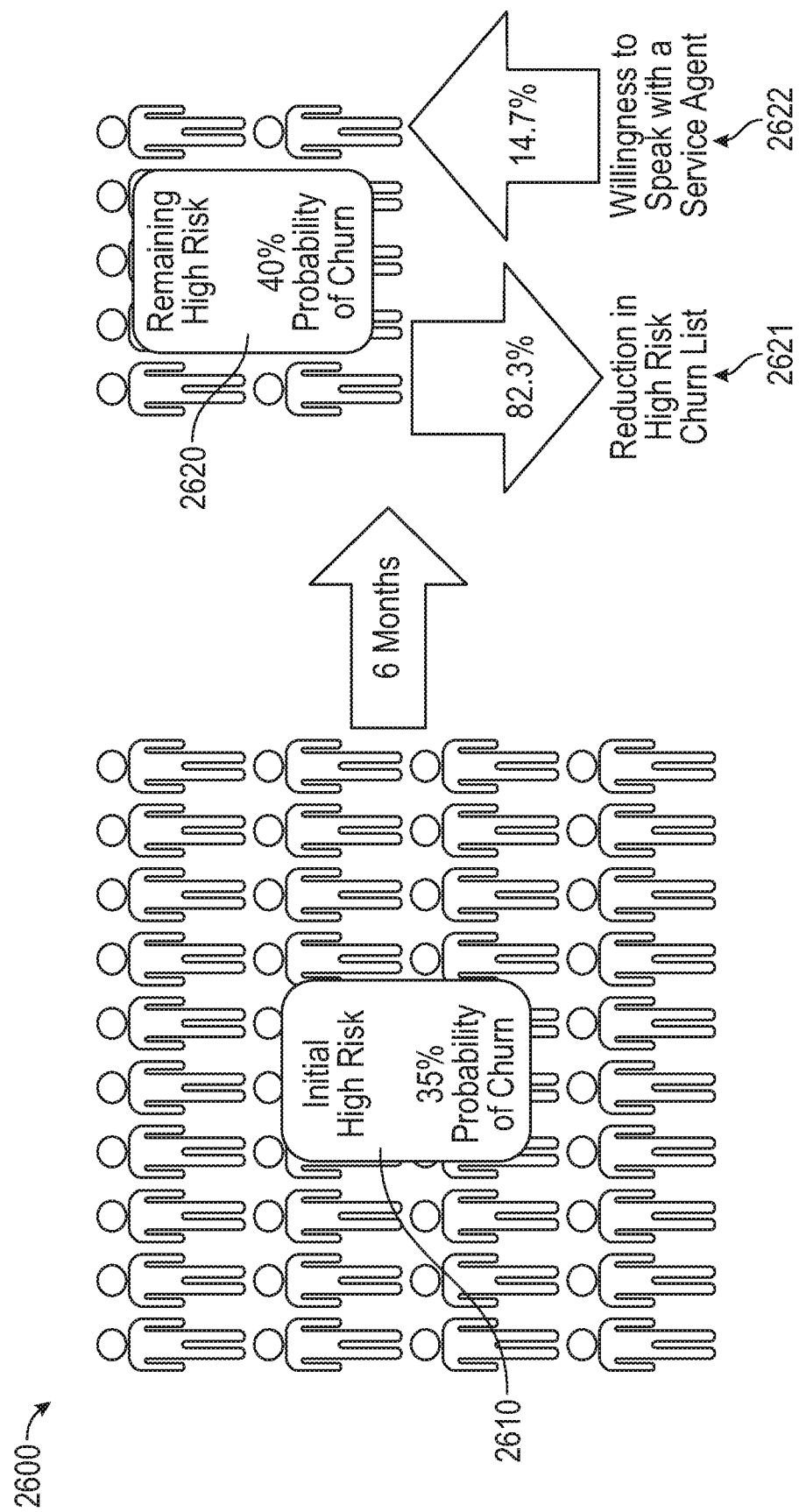
FIG. 26 is an illustration of the churn reduction impact of quality improvements.

FIG. 26 is an illustration 2600 of the churn reduction impact of quality improvements. As can be seen on the left hand side of FIG. 26, an initial high risk group 2610 may have a 35% probability churn. After 6 months of providing quality improvements, a smaller portion of those users who remain are still likely to churn. For example, the remaining high risk group 2620 may have a 40% probability churn. However, the high risk churn list becomes smaller. For example, there may be a 82.3% reduction in the size of the high risk churn list 2621. At the same time, the group of those willing to speak with a service agent may become larger. For example, among the high risk group 2620, there may be a 14.7% increase in willingness to speak with a service agent 2622.

In addition to providing insight into subscriber churn, the system may provide insights into market penetration/saturation, duration of each subscription, prime-time and potential reasoning for dropping a subscription service. Market penetration was once a major part of service providers growth strategies but is starting to see saturation. This may raise the importance of churn prevention to offset the impact.

Prime-Time proved to still be valid as seen by pattern changes as the 7:00-10:00 PM period slides across time-zones. The networks and CDNs are exposing geolocation and time-dependent load patterns for backbones, edge and VOD servers.

Armed with data about the quality and usage of a service for each individual subscriber, when someone expresses interest in cancelling a service, they may be presented with articulate rationale as to why not to cancel. The ease of joining—and cancelling—a service is becoming a critical factor in the overall customer experience. The theory is that if you make it easy to join and easy to cancel you will have a better chance of retaining a subscriber in the long run. In an embodiment, joining and cancelling a service may be fully automated, for example, may be performed over the internet, over short message service messaging or the like. When a subscriber attempts to cancel a service, the subscriber may be provided offers as an incentive to stay. These offers may be generated from machine learning algorithms and may be provided via automated means, for example, displayed on a television, prompted via SMS, etc.

OTT offers an array of compelling new business models, including personalization at a global scale. This changes everything from the size and type of content, to how content is measured and monetized. This trend also introduced new players such as FAANG, who already have an intimate relationship with consumers. These new players are also early pioneers of Cloud, Big Data, and AI. Now, the new and traditional players alike are looking toward these new technologies to gain an ever-shrinking competitive advantage.

In some embodiments, machine learning algorithms may be employed to bring visibility into system blind spots. Methods, systems and software disclosed herein may be built on a private or public cloud.

Figure 27:
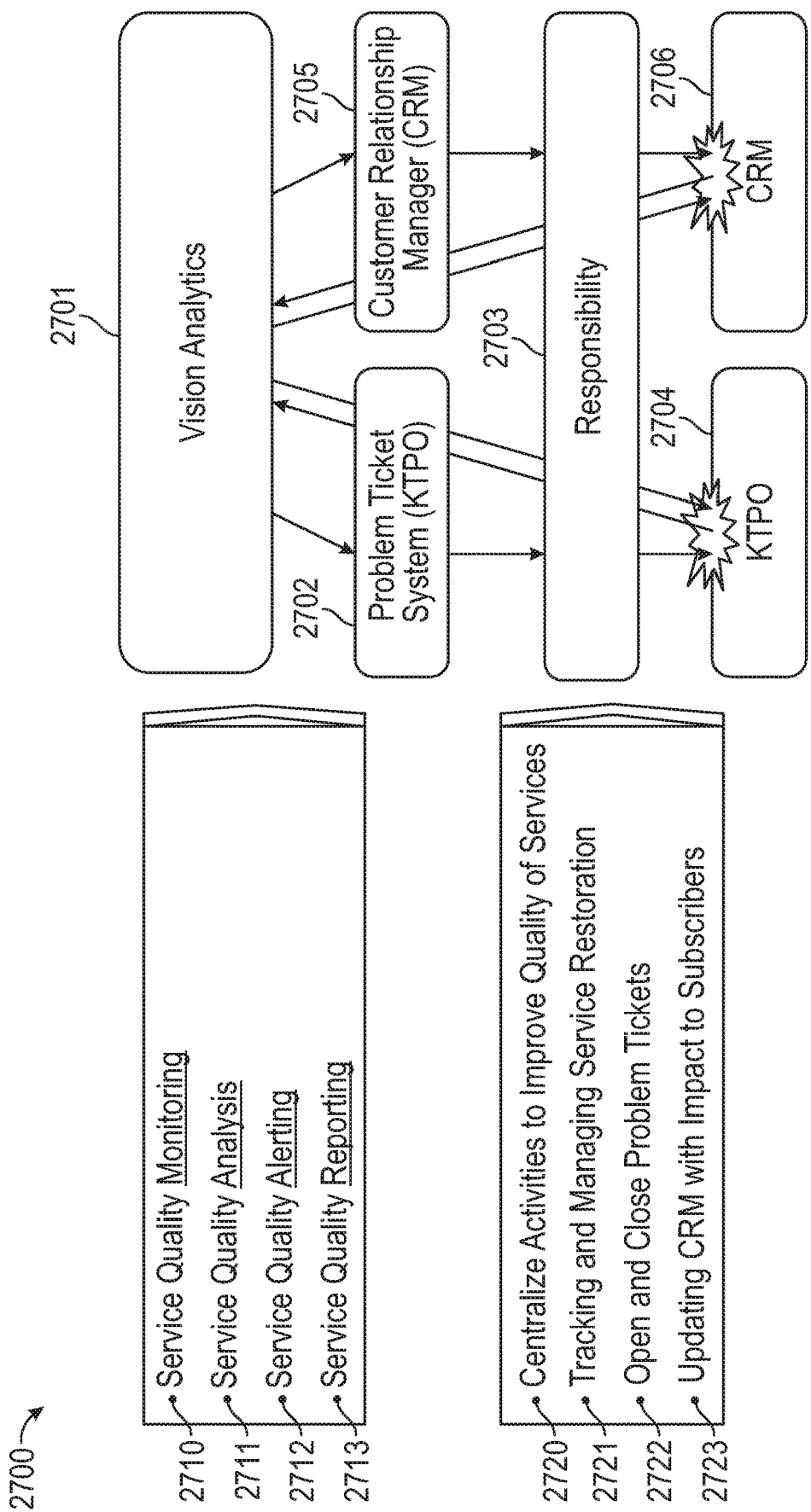
FIG. 27 is high level model of an analytics system.

FIG. 27 is a high level system model 2700. The system 2701 may perform service quality monitoring 2710, service quality analysis 2711, service quality alerting 2712 and service quality reporting 2713. The system 2701 may generate predictive tickets based on the service quality monitoring 2710 and pass the tickets to a problem ticket system (KTPO) 2702. A responsibility 2703 may be determined for each ticket and the KTPO 2704 may provide a report for which a service quality analysis 2711 may be derived from. Service quality alerting 2712 and reporting 2713 may be to a customer relationship manager (CRM) 2705. The CRM 2706 may then take corrective actions accordingly.

The system may centralize activities to improve quality of service(s) 2720, perform tracking and management of service restoration 2721, open and close problem tickets 2722 and update the CRM 2706 with information on an impact to subscribers 2723.

Figure 28:
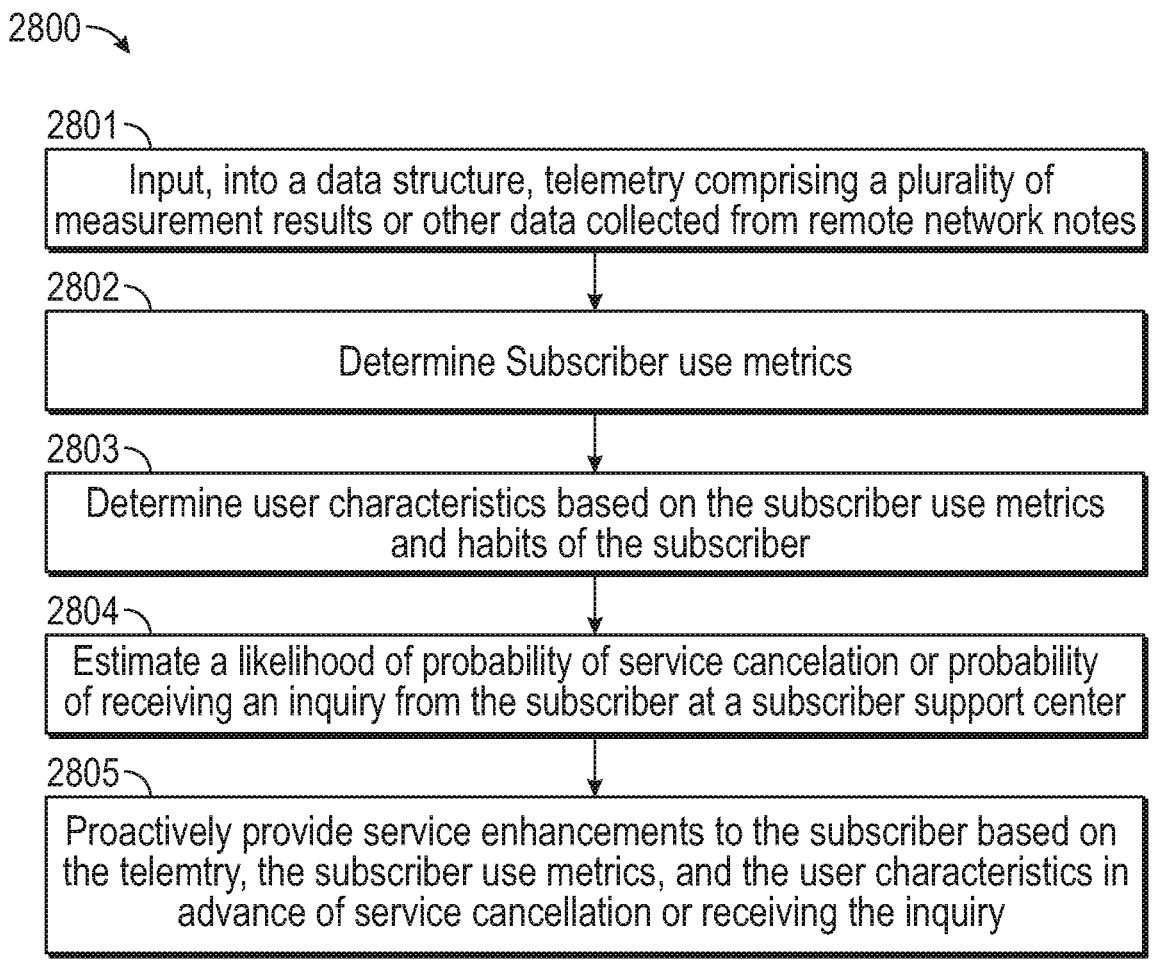
FIG. 28 is a flowchart for proactively providing service enhancements based on telemetry.

FIG. 28 is a flowchart 2800 for proactively providing service enhancements based on telemetry. In an embodiment, telemetry may be input into a data structure 2801. The telemetry may comprise measurement results or other data collected from remote network nodes. Subscriber use metrics may be determined from the collected telemetry data 2802. User characteristics may be determined based on the subscriber use metrics and habits of the subscriber 2803. With the user characteristics, an estimate may be made of a likelihood of a subscriber cancelling the service or at least making a call to a support center to report a problem 2804. Subscribers who have a high estimate may be proactively provided service enhancements 2805. This may be done based on the telemetry, subscriber use metrics and the user characteristics. Ideally, this will be performed before the user calls the support center and certainly should occur before the subscriber cancels service.

What is claimed is:

1. A method comprising:
   inputting telemetry into a database, wherein the telemetry comprises a plurality of measurement results or other data collected from one or more nodes including a set top box (STB), television or over the top player application (OTT player app);
   determining subscriber use metrics including at least one periodic metric and at least one non-periodic metric, wherein the at least one periodic metric is a number of decoded video frames, a number of erroneously decoded video frames, a number of errors in a video stream, a number of decoded audio frames or a number of errors in audio data, wherein the at least one non-periodic metric is a channel switching time, central processing unit (CPU) boot time or data buffering metric;
   determining at least one user characteristic, wherein the at least one user characteristic corresponds to a viewing habit, geolocation, service plan cost, additional purchase or history of calls to a support center;
   estimating a likelihood of service cancellation of a subscriber or a likelihood of receiving an inquiry from the subscriber at a subscriber support center based on a correlation between the telemetry, the subscriber use metrics or the at least one user characteristic and historical data of one or more subscribers who actually cancelled a service; and
   proactively providing service enhancements to the subscriber, based on the likelihood of service cancellation or the likelihood of receiving an inquiry from the subscriber in advance of service cancellation or receiving an inquiry, wherein the service enhancements include content delivery quality improvements in advance of the service cancellation or of receiving the inquiry.

2. The method of claim 1, wherein the service enhancements include providing a message to the subscriber or connecting the subscriber to a service representative.

3. The method of claim 1, wherein the subscriber use metrics are determined via the telemetry.

4. The method of claim 1, wherein the telemetry includes data collected from a STB.

5. The method of claim 1, wherein the telemetry includes data collected from a television.

6. The method of claim 1, wherein the telemetry includes data collected from an OTT player app.

7. The method of claim 1, wherein the periodic metric is a number of erroneously decoded video frames.

8. The method of claim 1, wherein the non-periodic metric is CPU boot time.

9. A system comprising:
   a database configured to receive telemetry, wherein the telemetry comprises a plurality of measurement results or other data collected from one or more nodes including a set top box (STB), television or over the top player application (OTT player app);
   componentry configured to determine subscriber use metrics including a number of decoded video frames, a number of erroneously decoded video frames or a number of errors in a video stream;
   the componentry configured to determine user characteristics, wherein the user characteristics include viewing habits, geolocation, service plan cost, additional purchases or a history of calls to a support center;
   the componentry configured to estimate a likelihood of service cancellation of a subscriber or a likelihood of receiving an inquiry from the subscriber at a subscriber support center, based on a correlation between the subscriber use metrics or the user characteristics and historical data of one or more subscribers who actually cancelled a service; and
   a transmitter configured to provide enhanced services to the subscriber in advance of service cancellation or receiving an inquiry, based on the likelihood of service cancellation or the likelihood of receiving an inquiry from the subscriber, wherein the enhanced services include content delivery quality improvements in advance of the service cancellation or of receiving the inquiry.

10. The system of claim 9, wherein the enhanced services include providing a message to the subscriber or connecting the subscriber to a service representative.

11. A system comprising:
   a database configured to receive telemetry, wherein the telemetry comprises data collected from over the top player applications (OTT player apps) corresponding to a plurality of subscribers who actually cancelled a service;
   componentry configured to train a neural network based on the telemetry;

componentry configured to estimate a likelihood of a service cancellation of a subscriber or a likelihood of receiving an inquiry from the subscriber at a subscriber support center, based on a correlation between the telemetry corresponding to the subscribers who actually cancelled the service and telemetry of the subscriber; and a transmitter configured to provide enhanced services to the subscriber in advance of service cancellation or receiving an inquiry, based on the likelihood of service cancellation or the likelihood of receiving the inquiry from the subscriber, wherein the enhanced services content delivery quality improvements in advance of the service cancellation or of receiving the inquiry.

12. The system of claim 11, wherein the estimate of the likelihood of service cancellation of the subscriber or the likelihood of receiving an inquiry from the subscriber is based on access equipment type.

13. The system of claim 11, wherein the estimate of the likelihood of service cancellation of the subscriber or the likelihood of receiving an inquiry from the subscriber is based on service plan cost.

14. The system of claim 11, wherein the estimate of the likelihood of a service cancellation of the subscriber or the likelihood of receiving an inquiry from the subscriber is based on additional purchases beyond that of a service plan.

15. The system of claim 11, wherein the estimate of the likelihood of a service cancellation of the subscriber or the likelihood of receiving an inquiry from the subscriber is based on a city or town population.

16. The system of claim 11, wherein the estimate of the likelihood of a service cancellation of the subscriber or the likelihood of receiving an inquiry from the subscriber is based on viewing preferences.

17. The system of claim 11, wherein the estimate of the likelihood of a service cancellation of the subscriber or the likelihood of receiving an inquiry from the subscriber is based on geolocation.

18. The system of claim 11, wherein the estimate of the likelihood of a service cancellation of the subscriber or the likelihood of receiving an inquiry from the subscriber is based on a network location.

19. The system of claim 11, wherein the estimate of the likelihood of a service cancellation of the subscriber or the likelihood of receiving an inquiry from the subscriber is based on a history of calls to a support center.

20. The system of claim 11, wherein the estimate of the likelihood of a service cancellation of the subscriber or the likelihood of receiving an inquiry from the subscriber is based on a head end quality indicator.

* * * * *